US005157903A

United States Patent [19]

Nakashima et al.

[11] Patent Number: 5,157,903

[45] Date of Patent: Oct. 27, 1992

[54] FILM-FOLDING DEVICE FOR PACKAGING APPARATUS

[75] Inventors: Masami Nakashima; Kazuhiko Takemura; Kiichi Terashima, all of Shiga; Yoshinori Komori, Kyoto; Kenji Hirobe, Shiga, all of Japan

[73] Assignee: Ishida Scales Mfg. Co., Ltd., Kyoto, Japan

[21] Appl. No.: 611,022

[22] Filed: Nov. 9, 1990

[30] Foreign Application Priority Data

| | | | |
|---|---|---|---|
| Nov. 10, 1989 | [JP] | Japan | 1-131377[U] |
| Nov. 14, 1989 | [JP] | Japan | 1-296407 |
| Nov. 30, 1989 | [JP] | Japan | 1-139531[U] |
| Dec. 1, 1989 | [JP] | Japan | 1-140183[U] |
| Feb. 24, 1990 | [JP] | Japan | 2-18041[U] |
| Feb. 26, 1990 | [JP] | Japan | 2-19338[U] |
| Feb. 27, 1990 | [JP] | Japan | 2-20090[U] |
| Sep. 4, 1990 | [JP] | Japan | 2-235104 |
| Sep. 7, 1990 | [JP] | Japan | 2-94685[U] |

[51] Int. Cl.[5] ..... G01G 23/38

[52] U.S. Cl. ..... 53/504; 53/222; 53/556; 493/476

[58] Field of Search ..... 53/504, 66, 222, 223, 53/228, 230, 556, 441; 493/476, 479, 478

[56] References Cited

U.S. PATENT DOCUMENTS

| | | | |
|---|---|---|---|
| 2,113,239 | 4/1938 | Petskeyes . | |
| 3,662,513 | 5/1972 | Fabbri | 53/222 X |
| 4,178,740 | 12/1979 | Groom | 53/556 |
| 4,268,163 | 5/1981 | Doi | 271/274 X |
| 4,458,470 | 7/1984 | Fine | 53/502 |
| 4,505,092 | 3/1985 | Bowers et al. | 53/66 X |
| 4,513,558 | 4/1985 | Treiber | 53/77 |
| 4,543,766 | 10/1985 | Boshinski | 53/64 |
| 4,548,024 | 3/1985 | Fine | 53/502 |
| 4,615,757 | 10/1986 | Treiber . | |
| 4,709,531 | 12/1987 | Denda | 53/66 X |
| 4,748,800 | 6/1988 | Takamura | 53/222 X |
| 4,796,405 | 1/1989 | Owen et al. | 53/222 |
| 4,944,135 | 7/1990 | Treiber | 53/502 |

FOREIGN PATENT DOCUMENTS

| | | |
|---|---|---|
| 0092760 | 11/1983 | European Pat. Off. . |
| 0176662 | 4/1986 | European Pat. Off. . |
| 0211478 | 2/1987 | European Pat. Off. . |
| 0315241 | 5/1989 | European Pat. Off. . |
| 0374137 | 6/1990 | European Pat. Off. . |
| 1254930 | 11/1967 | Fed. Rep. of Germany . |
| 2080240 | 2/1982 | United Kingdom . |
| 2129126 | 5/1984 | United Kingdom . |

*Primary Examiner*—James F. Coan
*Attorney, Agent, or Firm*—Heller, Ehrman, White & McAuliffe

[57] ABSTRACT

A weighing-packaging-pricing apparatus has a roll supporting device to rotatably support a film roll, a film transporting device to pull a stretch film from this film roll and to transport a stretched film sheet to a packaging station, a weighing device for weighing and measuring the dimensions of an object on a tray to be packed while it travels to a lifter which lifts the object to the packaging station and pushes it against the stretched film sheet, and a folding device for folding edge sections of the film sheet to form a package. The folding device includes transversely moving plates for folding side edge sections of the film sheet, and the motion of these plates is controlled according to the size of the tray to be packaged.

8 Claims, 22 Drawing Sheets

FILM-FOLDING DEVICE FOR PACKAGING APPARATUS

BACKGROUND OF THE INVENTION

This invention relates to a film-folding device for a packaging apparatus, and, more particularly, to such a device for a weighing-packaging-pricing apparatus foi weighing an item such as fresh produce placed on a tray, packaging it by wrapping it together with the tray with a stretch sheet of polyethylene film or the like, and issuing a printed price label showing its price.

So-called pre-packaged merchandises, such as fresh produce placed on a styrofoam tray and wrapped with a stretch film with the tray, are commonly available nowadays at supermarkets and elsewhere. Apparatus for producing such pre-packaged merchandises usually includes a roll supporting device for rotatably supporting a roll of stretch film, a film transporting device for providing a film sheet of a desired size and holding it stretched for a packaging process, a weighing device for weighing items to be packaged including a tray, a lifter for lifting the weighed item to press it against a film sheet stretched above the lifter, a folding machine for folding the edge sections of the film sheet around the edges of the tray, and a sealing device for heating the folded edge sections of the film sheet. In addition, some apparatus are also provided with a label printer for printing the price of each packaged product on a label to be pasted thereon. It now goes without saying that each of these many constituent devices, having different functions to perform, can be improved.

Regarding the mechanism for supporting a roll of film, it is desirable that such a mechanism be able to support film rolls of different lengths (for films of different widths) so that trays of different sizes can be used. According to Japanese Patent Publication Tokkai 57-194915, a plurality of mutually parallel and vertically extending endless belts for clamping one side edge of a film to be transported are stretched around a frame. A bar is attached to this frame and the user holds this handle to manually move the frame in the transverse direction according to the width of the film to be used. When a different film roll with a different length is to be used, however, at least one of the film transporting mechanisms on one side of the film must be manually moved in the transverse direction so as to adjust the distance between the mechanisms for clamping the individual side edge sections of the film according to the length of the new film roll to be installed. Such adjustments are extremely cumbersome.

After a film is pulled out of such a roll, it is directed to a film-feeding mechanism which usually includes a motor-operated film-feeding roller and a holding member contacting this roller. The front edge of the film is hung around the roller so as to be sandwiched between this roller and the holding member. In order to make certain that the film will advance reliably when this roller is driven by a motor, use is generally made of a roller with a high-precision mirror surface in order to increase friction between the roller surface and the film. The film, on the other hand, tends to stick to this mirror surface. When a new roll of film is installed, therefore, the user finds it extremely difficult to quickly and accurately direct its front edge to the film-feeding mechanism. In other words, the user usually lifts the holding member and inserts the film into the film-feeding mechanism while keeping the space above the film-feeding roller empty but this space is limited and it is difficult to prevent the film from coming into contact with this mirror surface. If even a small portion of the film comes into contact with the mirror surface and becomes firmly attached to it, the film cannot be advanced evenly as a whole and tends to become wrinkled. Moreover, when this film-feeding roller is not being operated by its motor, the mot or serves as a brake and film-feeding roller cannot be rotated easily by hand. This makes it also difficult to adjust the orientation of the film once it becomes attached to the mirror surface of the film-feeding roller.

If trays of different sizes are used but the film is always cut into sheets of the same size, the tray may be too big and cannot be properly packaged or may be too small and the edge sections to be folded are too wide. In order to adjust the size of the sheets into which the film is cut according to the size of the tray to be used, Japanese Patent Publication Tokkai 61-81913 disclosed a method whereby a plurality of sensors are provided along the path on which trays are transported. Use of a large number of sensors, however, increases the production cost of the apparatus.

As for the lifter for lifting a weighed object up to a position where it is packaged, use is usually made of a plurality of legs supported on a base plate for the convenience of allowing folding plates to slide underneath the tray when the edge sections of the film sheet are folded downward towards the bottom surface of the tray. Each leg is capped by a head which can be bent in a specified direction to accommodate these folding plates. If a lifter with a large base plate and a large number of legs is used to support and lift a tray which is relatively small, however, those of the legs in peripheral areas not supporting the tray tend to obstruct the motion of the folding plates and/or to prevent the edge sections of the film from hanging down sufficiently low so as to be properly folded by the folding plates. Japanese Patent Publication Tokkai 63-248612 disclosed a lifter with two groups of legs, a center group for use in the case of a smaller tray and a peripheral group for use together with the center group in the case of a larger tray. According to this disclosure, however, two lifter base plates are required, each provided with its own driving means for its vertical motion. As a result, the overall structure becomes complicated and the apparatus becomes large.

As for the folding device, it is usually provided with a pair of left-hand and right-hand side folding plates and a back folding plate which move transversely and longitudinally, respectively, to fold the edge sections of the film sheet stretched over the loaded tray. A discharge pusher is then operated to push the tray forward past a perpendicularly extending bar by means of which the front edge section of the film sheet is also folded towards the bottom surface of the tray. Needless to say, these folding plates and the discharge pusher must be operated in a well coordinated manner according to a carefully designed time schedule. Japanese Patent Publications Tokkai 61-60410 and 61-190408 disclosed systems whereby the timing for the operation of the left-hand and right-hand side folding plates can be varied according to the transverse (left-to-right) dimension of the tray to be packaged. In other words, the longitudinal dimension of the tray is completely ignored and its folding plates are operated without regard to it. Thus, the folded film sheet may become wrinkled or slackened especially near the corners. When a loaded tray is lifted against a stretched film sheet, the film sheet should be properly stretched not only in the transverse direction but also in the longitudinal direction (the direction of its motion). Japanese Patent Publication Tokkai 63-71060 suggested a use of a dancer roller between the film roll and the film-supplying system but the position of such a roller must be accurately determined in order to provide a uniform tension to the film sheet. Moreover, the film is bent around such a roller and hence its setting becomes complicated and workability of the apparatus is adversely affected. In the case of an apparatus with a cutter which cuts the film into a desired size before it is used for packaging, furthermore, the tension provided by the dancer roller has no effect on the tension in the cut sheet. Japanese Utility Model Publication Jikkai 61-48106 disclosed a pair of units disposed for clamping a film to transport it in such a way that their separation increases in the direction of film transportation. In this case, however, the tension on the film is not uniform along the direction of its motion. The tension on one side may become excessively large or the other side may not experience enough tension. If the tension is too large, peripheral parts of the tray may be bent or the film may break. If the tension is insufficient, the film is likely to develop wrinkles or slack parts. With a film transporting device of this type, furthermore, the clamps on the side edge sections of the film being transported should not be released too soon or too late. If the clamps are released too soon, the film becomes slack. If the clamps are released too late, an excessive tension may be applied on the film when the folding plates push the edge sections of the film, causing the film to break.

When an apparatus for weighing and packaging is used only for the purpose of weighing already packaged products and of having price labels printed, the apparatus is operated in a different mode and the sealing device, which is not required in such mode of operation, may obstruct the user's operation. Moreover, it is cumbersome to input the selection of a different mode of operation every time it is desired to use the apparatus only for having price labels printed.

SUMMARY OF THE INVENTION

In view of the above, it is an overall object of the present invention to provide a generally improved apparatus for weighing, packaging and/or pricing merchandises such as fresh produce placed on a tray.

It is one of more specific objects of the invention to provide an improved film-supplying device for a packaging apparatus with which film rolls can be exchanged easily provide an improved folding device with which a stretched film sheet can be folded downward to the bottom surface of the loaded tray being packaged such that the film does not become wrinkled or slackened in spite of variations in the longitudinal and transverse dimensions of the tray.

The above and other objects of the present invention are achieved by providing improved roll supporting, film transporting, weighing, tray-lifting, film-folding, sealing and control devices for a weighing-packaging pricing apparatus, or a weighing-packaging-pricing apparatus having such devices as its components. An improved roll supporting device according to the invention may be characterized as having a structure which supports a film roll rotatably, a film transporting device which clamps side edge sections of a film pulled out of this roll supporting structure and transports the film to a packaging station, and an for automatically adjusting the clamping positions on the film according to the position of the film roll on the supporting structure, or alternatively according to the length of the film roll. The roll supporting structure may be further characterized as including a roll bar for supporting the film roll, a fixed holder affixed to this roll bar, and a movable holder which is movable along the roll bar, these two holders clamping and supporting the film roll in between. The film transporting device may be described as including a fixed unit and a movable unit each clamping one side edge of the film but the distance separating them can be adjusted. The movable unit is moved by means of a motor according to the position of the movable holder. An elastic means such as a spring is provided to apply a biasing force so as to push the two holders toward each other and the fixed holder has a diameter small enough so as to be able to pass through the film roll. After the film roll is passed over the fixed holder, a piece protrudes to engage them together.

A device according to the invention for supplying a film to a packaging apparatus may be characterized as comprising feed rollers and a vertically movable member such that the film is wound over these rollers and pressed down by this movable member as a motor drives these feed rollers to advance the film. A braking means is provided to keep the feed rollers in a braked condition but a control device is so programmed that the rollers are released from their braked condition if the pressing member is lifted while the motor is not being operated. In this manner, the film can be adjusted easily as it is fed into the film transporting device.

A lifter embodying the invention may be characterized as having a plurality of legs standing on a base plate, each leg having a head piece at the top which can be bent in a specified direction and some of the legs in a peripheral regions being made collapsible such that, after the lifter takes the object up to the packaging station, folding plates of the folding device can effectively fold edge sections of the film in a packaging operation whether the object to be packaged is relatively large or small.

A folding device according to the present invention may be characterized as comprising a pair of side folding plates moving towards each other from the left-hand and right-hand sides of the object, a back folding plate moving forward from behind the object, and a pusher for pushing the object forward from behind over a transversely disposed bar. These folding plates and the pusher are operated according to calculated dimensions of the object such that edge sections of the film are folded by them neatly along lines that pass through its corners, thereby preventing wrinkles and slackening in the film.

A sealing device according to the present invention may be characterized as being disposed normally above the weighing device but adapted to be retracted when not in use. A detector is provided to determine whether the sealing device is in its normal position or in its retracted condition. If the detector founds out that the sealing device is retracted, the control device automatically selects a mode of operation in which the sealing device is not utilized.

The control device according to the present invention is programmed to serve various useful functions. In one aspect of the invention, it controls the feed rollers, the motor for advancing the film to the packaging station and a cutter disposed between the feed rollers and the film transporting device for perforating the film in such a way that the film is stretched when the cutter is operated to perforate the film. In another aspect of the invention, the control device controls the separation between units of the film transporting device individually clamping the left-hand and right-hand edge sections of the film so as to provide a desired tension to the film as the film is transported to the packaging station.

BRIEF DESCRIPTION OF THE DRAWINGS

The accompanying drawings, which are incorporated in and form a part of the specification, illustrate various aspects of the present invention and, together with the specification, serve to explain the principles of the invention. In the drawings.

DETAILED DESCRIPTION OF THE INVENTION

Figure 1:
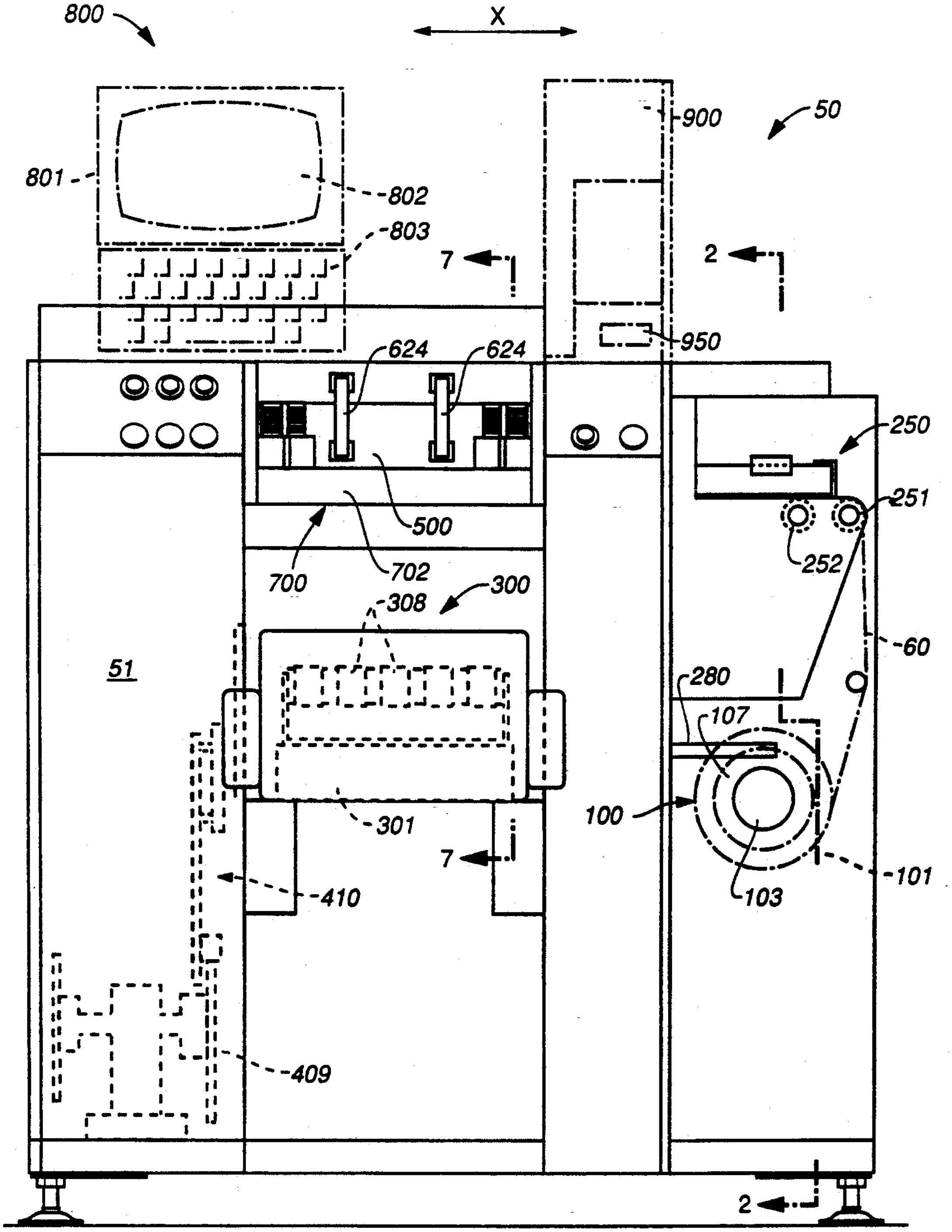
FIG. 1 is a front view of a weighing-packaging-pricing apparatus embodying the present invention.
Figure 2:
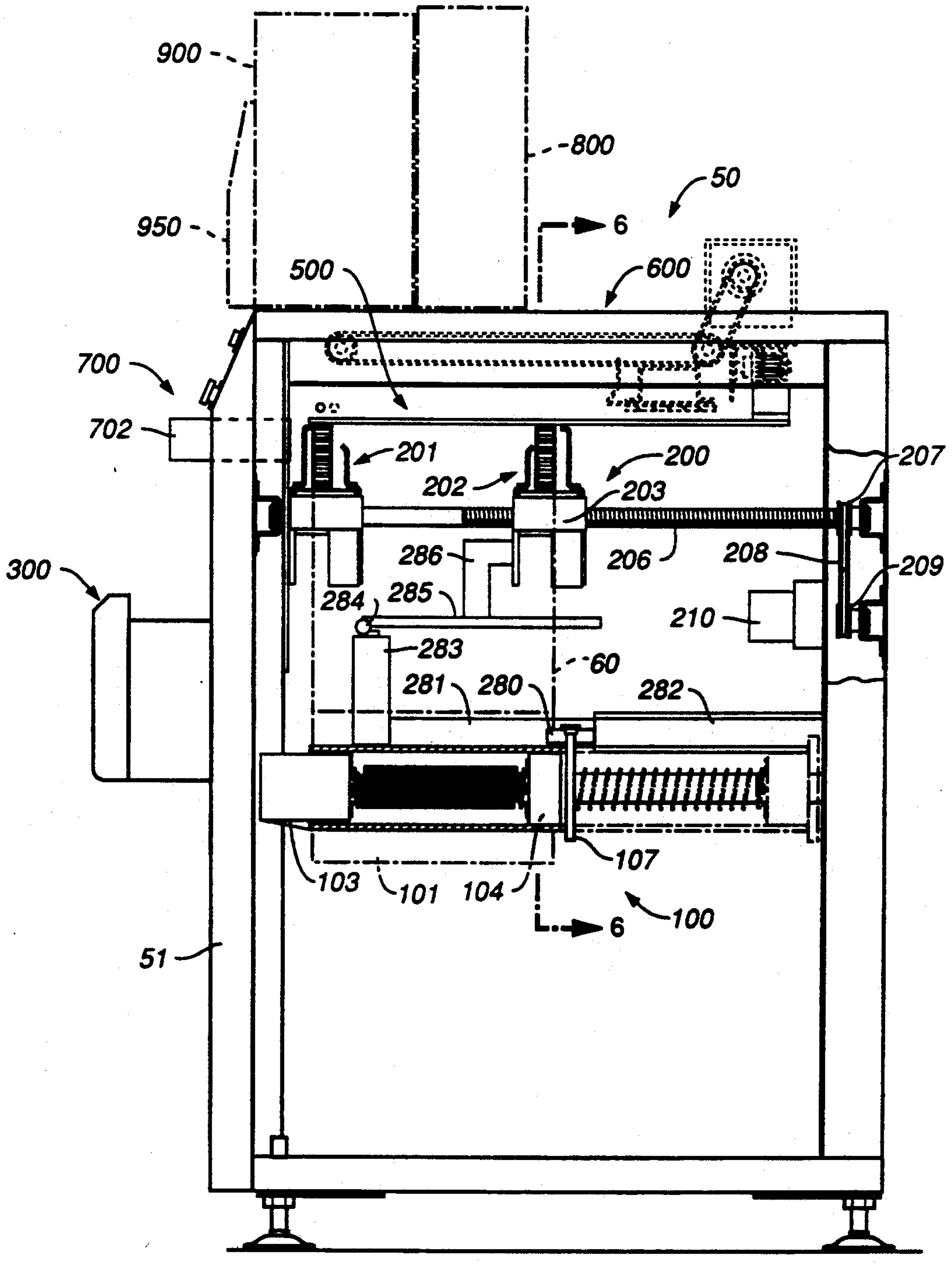
FIG. 2 is a sectional side view of the apparatus of FIG. 1 taken along the line 2—2 therein.

As shown in FIGS. 1 and 2, a weighing-packaging-pricing apparatus 50 embodying the present invention is comprised of a roll supporting device 100, a film transporting device 200, a weighing device 300, a lifter 400, a packaging station 500, a folding device 600, a sealing device 700, a control device 800 and a label printer 900 having a label dispenser 950. The weighing device 300 is in front at the center of the main housing 51 of the apparatus 50. The roll supporting device 100 is disposed in one side section of the main frame 51 and rotatably supports a film roll 101 around which a stretch film 60 of a specified width is wound many times. The film transporting device 200 is for holding by clamping both side edge sections of the film 60 pulled out of the roll supporting device 100 to transport it to the packaging station 500 formed above the weighing device 300 inside the main housing 51. The lifter 400 is for receiving from the weighing device 300 an item or items 70 such as fresh produce placed on a tray 75 to be weighed and lifting it to the packaging station 500. The folding device 600 is for using the film 60 transported to the packaging station 500 to package the item 70 together with the tray 75. The sealing device 700 is disposed above the weighing device 300 and in front of the packaging station 500 and is for thermally sealing the film 60 which has been folded towards the bottom of the tray 75 by the folding device 600. The control device 800, equipped with a display 802 and a keyboard 803 as input means, is on the top surface of the main housing 51 and not only controls the operations of the weighing device 300, the film transporting device 200, the lifter 400, the folding device 600 and the sealing device 700 but also calculates the price of the item 70 on the basis of a signal indicative of its weight measured by the weighing device 300. The label printer 900 is for printing the weight, price, etc. of the packaged product on a label.

The label dispenser 950 is formed unistructurally with the label printer 900. The keyboard 803 of the control device 800 may be operated to switch from one to another of the modes of operation of the apparatus 50. Selectable modes of operation of the apparatus 50 include the weighing-packaging-pricing mode wherein the weighing device 300, the folding device 600, the sealing device 700 and the label printer 900 are operated so that an item or items to be packaged can be weighed, packaged and priced in one series of action, the packaging mode wherein the folding device 600 and the sealing device 700 are operated such that only the packaging process is effected on an item or items to be packaged, and the weighing-pricing mode wherein the weighing device 300 and the label printer 900 are operated such that an item which has been packaged in the packaging mode of operation is weighed and priced.

In what follows, the devices of which the apparatus 50 is comprised are described individually.

ROLL SUPPORTING DEVICE

Figure 3:
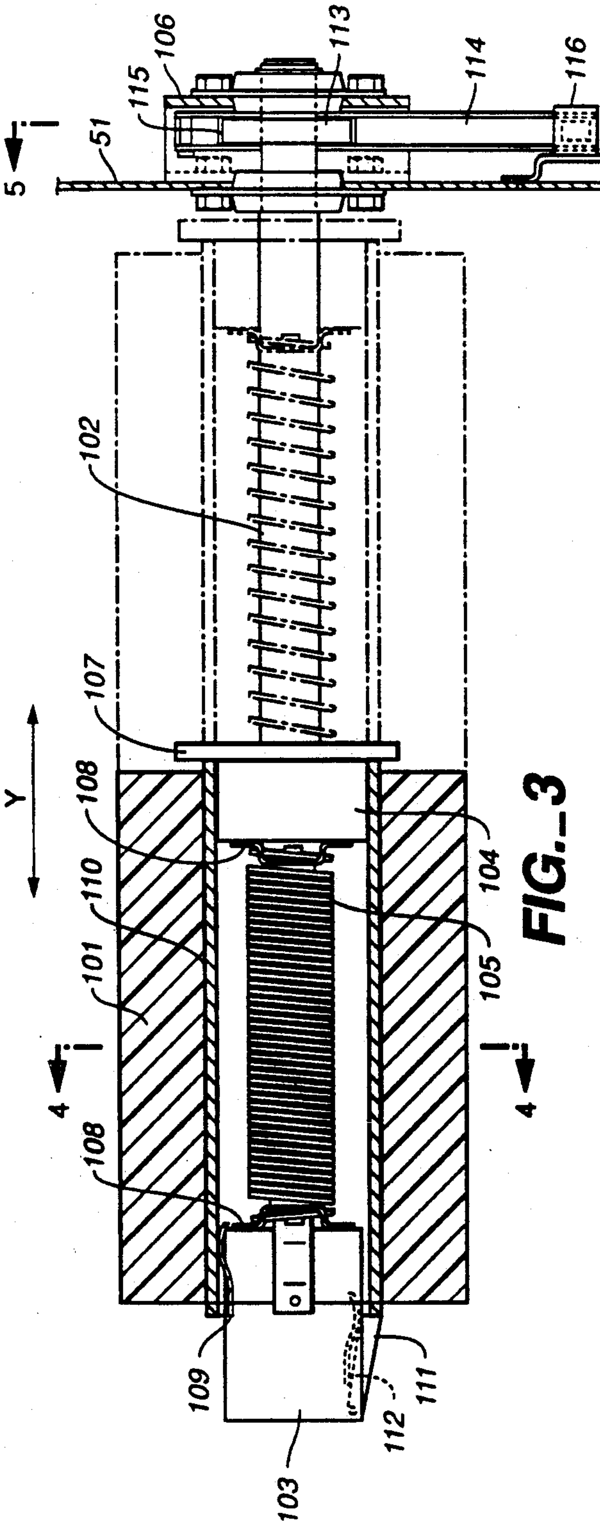
FIG. 3, is an enlarged sectional view of the roll supporting device shown in FIG. 1.
Figure 5:
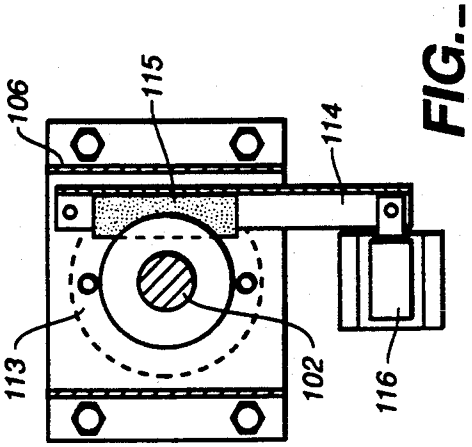
FIG. 5 is a sectional view taken along the line 5—5 of FIG. 3.
Figure 4:
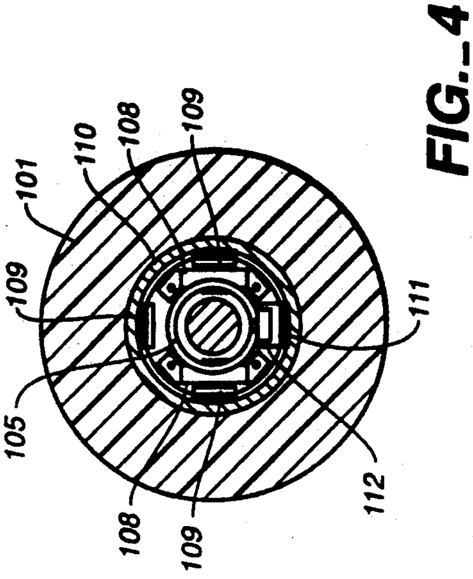
FIG. 4 is a sectional view taken along the line 4—4 of FIG. 3.

As shown in FIGS. 3, 4 and 5, the roll supporting device 100 for rotatably supporting the film roll 101 is formed basically with a roll bar 102, a fixed holder 103, a movable holder 104 and a coil spring 105. The roll bar 102 has one of its ends rotatably supported by a bracket 106 secured to the main housing 51 at a specified position. The fixed holder 103 is affixed to the other end of the roll bar 102 and its diameter is such that it can pass through the film roll 101 and support one end of the film roll 101. The movable holder 104 has a flange part 107 with a large diameter unistructurally formed therewith and is movable longitudinally along the extension of the roll bar 102 between the position shown with solid lines and the position shown with broken lines according to the width of the film roll 101. The movable holder 104 serves to support the other end of the film roll 101. The coil spring 105 is attached to a pair of pieces 108 affixed to the mutually opposite surfaces of the fixed holder 103 and the movable holder 104 such that its biasing force tends to pull them together.

The external circumferential surface of the fixed holder 103 is provided not only with a plurality of plate springs 109 which contact the inner surface of the core material 110 for the film roll 101 so as to prevent free rotation of the film roll 101 but also with a stopper member 111 which is biased by another plate spring 112 to protrude from this external circumferential surface of the fixed holder 103. When the film roll 101 is mounted, this stopper member 111 is pressed by the internal circumferential surface of the film roll 101 and is retracted into the fixed holder 103. After the film roll 101 has passed through the position of the stopper member 111, however, a portion of the stopper member 111 comes to protrude from the circumferential surface to engage with an end part of the film roll 101. Thus, if the film roll 101 is mounted from the side of the fixed holder 103 as shown in FIG. 2, the movable holder 104 moves along the roll bar 102 by a distance determined by the width of this film roll 101 and one end of the film roll 101 comes to be engaged with the stopper member 111. In this manner, the film roll 101 is kept in a mounted condition by being sandwiched between the fixed holder 103 and the movable holder 104. When it is desired to remove the film roll 101 from the roll bar 102, on the other hand, one has only to release the engaged condition of the stopper member 111 at one end of the core material 110. In other words, the film roll 101 can be exchanged easily according to the present invention.

On the end part of the roll bar 102 distal from the fixed holder 103 and supported by the main housing 51, there is a brake drum 113 unistructurally attached and a lever 114 to which a brake shoe 115 sliding against this drum 113 is supported rotatably. If this lever 114 is rotated by a solenoid 116 disposed at a specified position on the main housing 51, the brake shoe 115 comes to be pressed against the external circumferential surface of the drum 113 such that the rotary motion of the roll bar 102 is impeded and the film 60 is thereby prevented from becoming pulled from the film roll 101 more than necessary.

FILM TRANSPORTING DEVICE

The film transporting device 200, which is for transporting the film 60 pulled out of the roll supporting device 100 to the packaging station 500, is comprised of a fixed film transporting unit 201 and a movable film transporting unit 202 as shown in FIG. 2. The fixed film transporting unit 201 is disposed above one edge part (the left-hand edge as seen in FIG. 2) of the film roll 101 supported rotatably in the roll supporting device 100 and serves to hold by clamping one side edge section of the film 60 pulled out of the film roll 101 and to guide the film 60 to the packaging station 500. The movable film transporting unit 202 is disposed above the other edge part (the right-hand edge as seen in FIG. 2) of the film roll 101 and serves to hold by clamping the side edge section of the film 60 pulled out of the film roll 101 and to similarly guide the film 60 to the packaging station 500.

Figure 6:
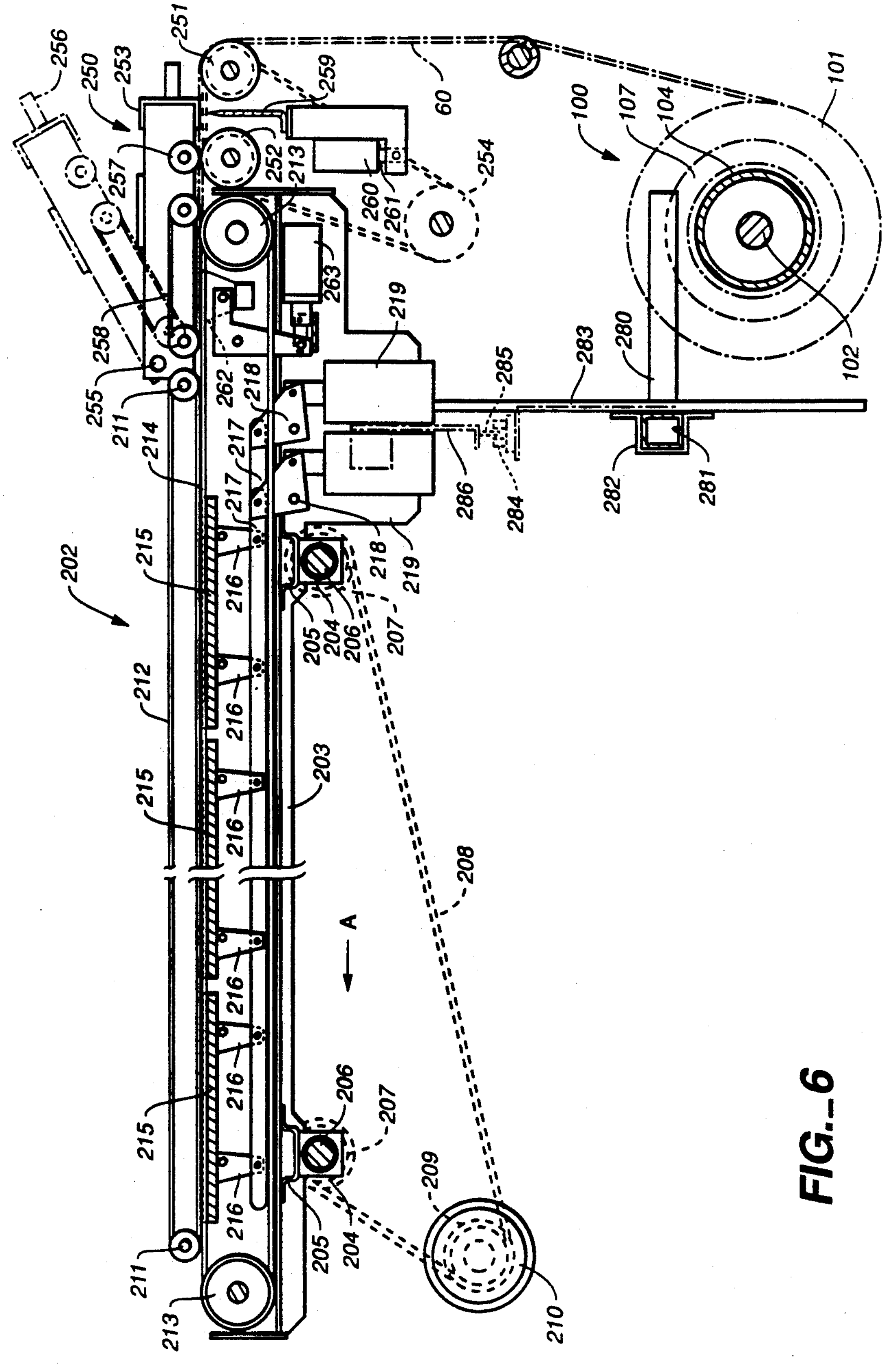
FIG. 6 is a sectional view taken along the line 6—6 of FIG. 2 to show the structure of the movable film transporting unit.
Figure 7:
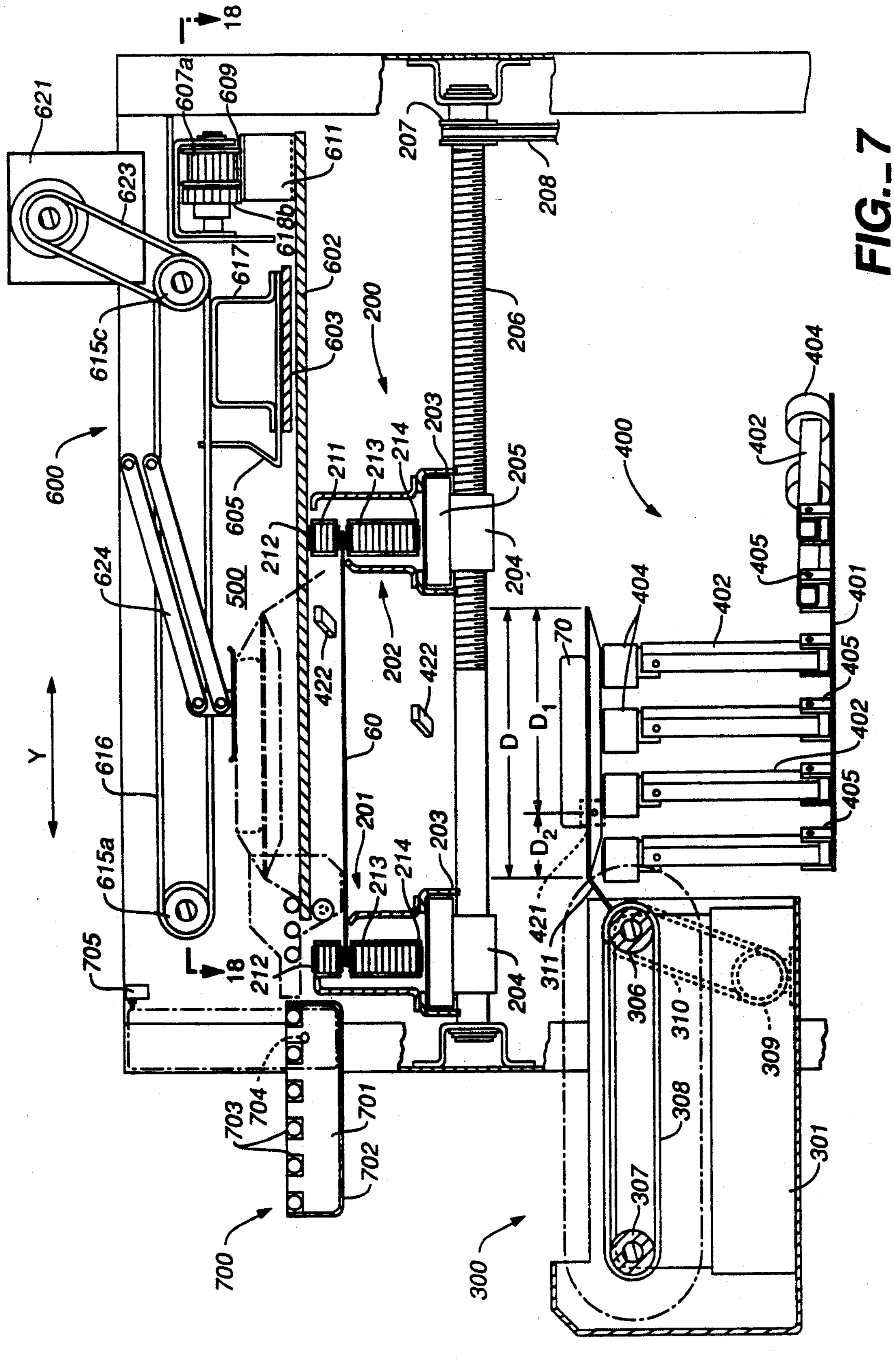
FIG. 7 is an enlarged sectional view taken along the line 7—7 of FIG. 1.

In FIGS. 6 and 7, numeral 203 indicates a frame for the fixed and movable film transporting units 201 and 202. A pair of slidable members 204 is attached to the bottom surface of this frame 203 through brackets 205 and respectively engages a pair of screw shafts 206 which are rotatably supported by the main housing 51. A sprocket 207 is secured to one end of each of these screw shafts 206. These sprockets 207 are connected by a chain means 208 with a sprocket 209 affixed to one end of the drive shaft of a screw-shaft motor 210 such that, when the screw shafts 206 are rotated by the operation of the screw-shaft motor 210, the pair of slidable members 204 slides along the screw shafts 206 and the movable film transporting unit 202 moves as a whole in the axial direction of the screw shafts 206. Thus, the separation between the movable film transporting unit 202 and the fixed film transportation unit 201 can be adjusted appropriately by operating the screw-shaft motor 210 according to the width of the film roll 101 being used. The fixed film transportation unit 201, on the other hand, is supported by these screw shafts 206 and secured to the main housing 51. The design described above, however, is not intended to limit the scope of the invention. The fixed film transporting unit 201 may be structured similarly to the movable film transporting unit 202 such that they can be both moved along the screw shaft 206 adjustingly according to the set axial position of the film 60 or that their positions can be fine-adjusted for accurately defining the width of the edge portions of the film 60.

Besides the above, the fixed film transporting unit 201 and the movable film transporting unit 202 are structured nearly identically. In what follows, therefore, the structure of the movable film transporting unit 202 will be described but the structure of the fixed film transporting unit 201 will not be separately presented.

As shown in FIG. 6, the frame 203 of the movable film transporting unit 202 rotatably supports a pair of (upper film-transporting) pulleys 211 between which a timing belt (hereinafter referred to as the upper transport belt 212) is stretched in the direction of transportation of the film 60 (indicated by the arrow A) and another pair of (lower film-transporting) pulleys 213 between which another timing belt or a flat belt (hereinafter referred to as the lower transport belt 214) is stretched parallel to and below the upper transport belt 212. One of the pulleys 213 is connected to a motor (not shown) such as a pulse motor such that, if this motor is operated, the film 60 sandwiched between the upper transport belt 212 and the lower transport belt 214 will be transported in the direction of the arrow A towards the packaging station 500.

FIG. 6 also shows a plurality of clamping members 215 below the lower transport belt 214 along the direction of the arrow A. Each of these clamping members 215 is attached to the top parts of a plurality of swing levers 216 which are supported by the frame 203 so as to be able to swing with respect thereto. Each swing lever 216 supports a pair of bar members 217 at its lower part. One end of each of these bar members 217 is connected through a connector member 218 to a solenoid 219 attached to the frame 203. FIG. 6 shows the clamping members 215 in their clamping positions, pushing the lower transport belt 214 upward such that the lower transport belt 214 is tightly in contact with the upper transport belt 212. If the solenoids 219 are activated under this condition, the connector members 218 cause the bar members 217 to move horizontally opposite to the direction of the arrow A. This causes the clamping members 215, through the swing levers 216, to separate from the lower transport belt 214, that is, to change from its clamping position to a non-clamping position. When the film 60, after it is cut to a desired length as will be explained below, is transported towards the packaging station 500, the clamping members 215 are in the clamping position such that the lower transport belt 214 is tightly in contact with the upper transport belt 212, securely sandwiching therebetween the edge sections on one side of the film 60. The edge sections of the film 60 on the other side can similarly be held securely between the upper and lower transport belts of the fixed film transporting unit 201.

The film transporting device 200 also includes a film feeding unit 250 where the film 60 pulled out from the roll supporting device 100 is received thereby. This film feeding unit 250 is so disposed for the purpose of feeding such a film received from the roll supporting device 100 into the space between the upper and lower transport belts 212 and 214 of both the fixed and movable film transporting units 201 and 202.

The film feeding unit 250 includes, for the aforementioned purpose, a pair of feed rollers 251 and 252 and a film holder 253. The feed rollers 251 and 252 are arranged in the direction of the film transportation shown by the arrow A and supported axially by the main housing 51 so as to be rotatable by means of a film feeding motor 254. Rollers with a mirror-finished roller surface may be used for the feed rollers 251 and 252 so as to improve the contact between the rollers 251 and 252 and the film 60. The film holder 253 is disposed above the pair of feed rollers 251 and 252 and is rotatable around a support axis 255 by a handle 256 so as to be able to assume both a closed position and an open position shown respectively by solid lines and broken lines in FIG. 6. The film holder 253 is provided with a compression roller 257 which, when the film holder 253 is in its closed position, compresses the feed rollers 252 on the downstream side so as to press the film 60 therewith and a feeder belt 258 which, when the film holder 253 is in its closed position, contacts the lower transport belts 214 of both the fixed and movable film transporting units 201 and 202 so as to secure the film 60 therewith. The film feeding unit 250 is further provided with a cutter (or a perforator) 259 which is disposed between the pair of feed rollers 251 and 252 and adapted to be activated by a cutter solenoid 260 to move upward and to thereby perforate the film 60 in the direction of its width (that is, perpendicular to the arrow A). The cutter solenoid 260 is attached to the main housing 51 such that its plunger 261 protrudes downward. When the solenoid is not activated, the cutter 259 is in a lowered position due both to its own weight and the weight of the plunger 261.

Below the lower transport belt 214 and opposite the feeder belt 258, furthermore, there is provided a clamping member 262 adapted to be activated by a clamp solenoid 263 for clamping both side edge parts of the film 60. The feeder belt 258 is supported by means of a spring (not shown) so as to be movable upward and downward. When the film feeding unit 250 is in the open position, the feeder belt 258 is in a floated position shown by dotted lines in FIG. 6 and serves, in this floated position, to guide the leading front edge of the film 60 from the roll supporting device 100 onto the feed rollers 251 and 252. As will be described more in detail below, the film 60 is stopped temporarily after it is advanced by a specified distance by the feed rollers 251 and 252, the perforator is activated to make perforations in the film 60 in its transverse direction, the film 60 is thereafter further advanced until the perforation line reaches a position immediately on the downstream side of the clamping member 262, the clamping member 262 is caused to clamp the side edge parts of the film 60, and then the upper and lower transport belts 212 and 214 of the fixed and movable film transporting units 201 and 202 are operated to cut the film 60 along the perforation line and to thereby provide the packaging station 500 with a film sheet having a desired length.

Figure 8:
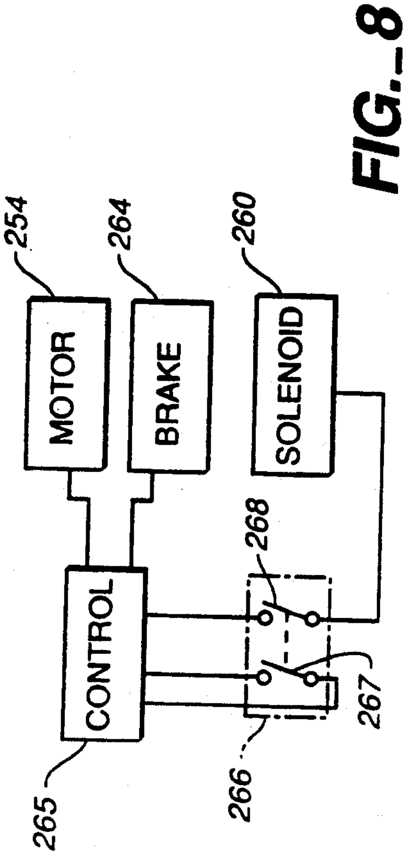
FIG. 8 is a block diagram for the control circuit for operating the feed rollers.

As schematically shown by a block diagram in FIG. 8, there is provided a braking means 264 for instantly stopping the motion of the film-feeding motor 254 as soon as a command signal to stop its motion is received such that the feed rollers 251 and 252 will also stop instantly without continuing their rotation by the inertia of the film-feeding motor 254. A control circuit (not shown) is provided such that both the film-feeding motor 254 and its braking means 264 are controlled by signals outputted from a control unit 265. This control unit 265 is so structured as to keep the film-feeding motor 254 locked by normally activating the braking means 264 when the film-feeding motor 254 is in non-operating condition. When the film holder 253 is lifted, for example, to install a new film roll, the control unit 265 releases this locked condition by the braking means 264.

Figure 9:
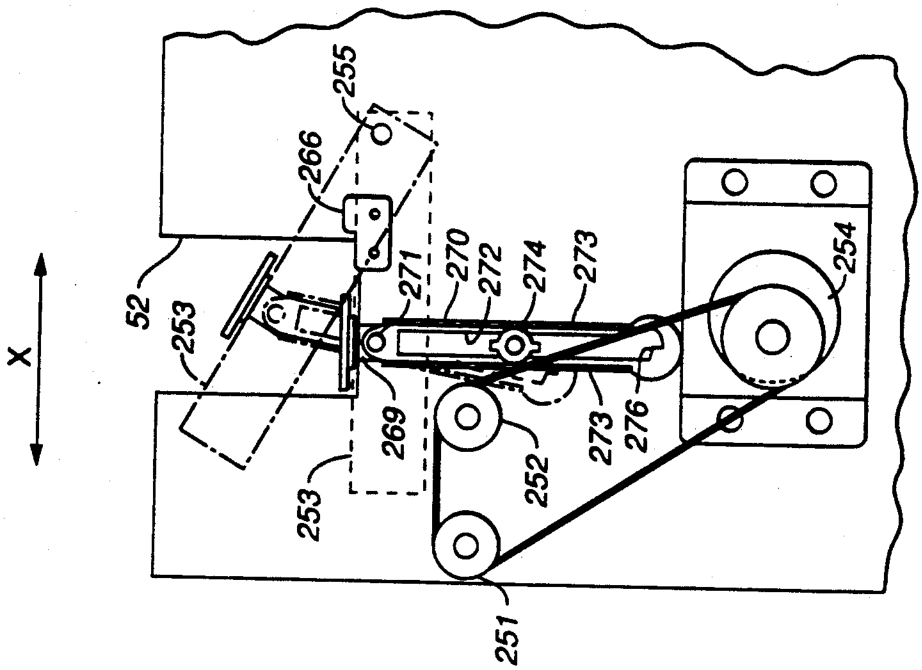
FIG. 9 is a side view of the mechanism for opening and closing the film holder.

For this purpose, a detector 266 is provided, as shown both in FIGS. 8 and 9, for detecting whether the film holder 253 is in open or closed condition. The control unit 265 is so structured that a first switch 267 in the detector 266 moves to an OFF position and outputs an OFF signal if the detector 266 detects that the film holder 253 is in the open position. If this OFF signal from the detector 266 is received, the control units 265 outputs a brake-release signal to the braking means 264. The detector 266 is also provided with a second switch 268 which is inserted in the line through which the control unit 265 transmits control signals to the cutter solenoid 260 for the cutter 259 and operates together with the first switch 267 such that when the first switch 267 is switched off, the second switch 268 is also switched off such that, the cutter solenoid 260 is not activated even if the control unit 265 outputs a signal for activating the cutter solenoid 260. The detector 266 is disposed at a window 52 of the main housing 51 as shown in FIG. 9 and detects the open and closed conditions of the film holder 253 through this window 52.

Figure 10:
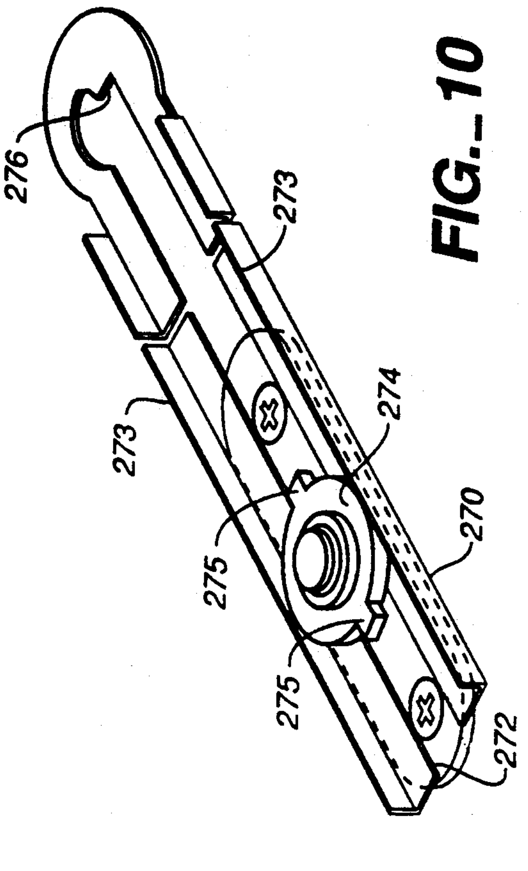
FIG. 10 is an enlarged diagonal view of the stay for supporting the film holder of FIG. 9.

The film holder 253 is provided with a bracket 269 at the position of the window 51 in the main housing 51. Outside the main housing 51, this bracket 269 is connected to the top end of an elongated supporting stay 270 through a pin 271. The supporting stay 270 is formed with a guide opening 272 elongated in its longitudinal direction, as more clearly shown in FIG. 10. Flange walls 273 are formed on both sides of and along this elongated opening 272. A stopper 274 attached to the outside surface of the main housing 51 engages with this elongated opening 272. The stopper 274 is adapted to rotate in one direction by 90° each time by means of a ratchet mechanism. Outwardly protruding knobs 275 are provided to the stopper 274. When the film holder 253 is closed, the supporting stay 270 moves downward to its lowered position and the stopper 274 is so oriented that its knobs 275 are in mutually vertically oriented positions. When the film holder 253 is lifted and the supporting stay 270 moves upward, the stopper moves downward (relative to the stay 270) through the guide opening 272 until the lower end of the opening 272 is reached. When the stopper 274 reaches the bottom of the opening 272, it rotates by 90° by hitting a cam 276 formed at the lower end. This causes the knobs 275 to be arranged in horizontal orientation and when the supporting stay 270 is lowered next by a small distance, these knobs 275 engage the lower ends of the flange walls 273. Thus, the supporting stay 270 becomes locked and the film holder 253 also becomes locked in its open position.

When the film holder 253 is lowered from its open position, the supporting stay 270 is lifted by a small distance so as to bring the stopper 274 to the position of the cam 276 and to thereby rotate it by 90°. The knobs 275 are then aligned in a vertical orientation such that, if the film holder 253 and the supporting stay 270 are lowered, the knobs 275 do not interfere with the downward motion of the film holder 253 and the stopper 274 slides through the guide opening 272 between the flange walls 273.

In summary, when the film holder 253 is lifted in order to install a new film roll 101 (with film), this is detected by the detector 266 and both its first and second switches 267 and 268 are opened to switch off the detector 266, outputting an OFF signal. Upon receiving this OFF signal, the control unit 265 continues to stop the power supply to the film-feeding motor 254 on the one hand and outputs a command signal to the braking means 264 to release the braked condition on the film-feeding motor 254. Since the second switch 268 is also open, this means that the cutter solenoid 260 is not activated and the perforator remains stationary as long as the film holder 253 is open, even if a command to operate the cutter 259 is erroneously outputted. After a new film roll 101 is installed while the film holder 253 is thus kept in its open position, the leading edge of the film 60 is pulled out from the roll supporting device 100 and wound around the feed rollers 251 and 252 and set on the lower transport belts 214 of both the fixed and movable film transporting units 201 and 202. If mirror-finished rollers are used as the feed rollers 251 and 252, the film 60 may stick to them before it is properly positioned. This phenomenon is more likely to happen with the feed roller 252 proximal to the roll supporting device 100. Even in such a situation, however, the feed rollers 251 and 252 are free to rotate because the film-feeding motor 254 is not braked, as explained above. Thus, the user can easily pull the film 60 to cause the feed rollers 251 and/or 252 to thereby set the film 60 at a correct position and to prevent it from wrinkling. While such an operation is taking place, the cutter solenoid 260 is prevented from being accidentally activated and the cutter 259 remains at its lowered position to which it has dropped by its own weight. A more detailed control by the control unit 265 will be given below in connection with the description of the control device 800.

Next, there will be explained a mechanism according to the present invention by which the separation between the fixed and movable film transporting units 201 and 202 can be adjusted according to, or to become equal to, the width of the film 60. As shown in FIGS. 2 and 6, the flange part 107 of the movable holder 104 engages with a bar 280 with an inverted U-shaped cross-section supported by a horizontally elongated member 281 which engages with a horizontal rail 282 so as to be horizontally slidable therealong with the horizontal motion of the movable holder 105 towards and away from the fixed holder 103. A bracket 283 is attached to one end of this horizontally elongated member 281 and a position sensor 284 for detecting the position of the movable film transporting unit 202 is secured to this bracket 283. Correspondingly, a horizontal bar 285 with an L-shaped cross-section is attached to the frame 203 of the movable film transporting unit 202 through a bracket 286 in such a way that the position of this horizontal bar 285 is detected by the position sensor 284 and hence that the position of the movable film transporting unit 202 can be adjusted according to the motion of the movable holder 104 when, for example, a new film roll is installed.

To explain this function more in detail, the screw-shaft motor 210 is operated, when the film roll 101 is to be replaced by a new one, to rotate the screw shafts 206 in an appropriate direction so as to move the movable film transporting unit 202 to the right (from its position shown in FIG. 2). This causes the horizontal bar 285 to be separated from the position sensor 284. When the movable holder 104 is moved after a new film roll 101 is installed, the position sensor 284 moves accordingly to a specified position determined by the width of the film 60 (that is, the length of the film roll 101). The movable film transporting unit 202 is thereafter moved to the left (with reference to FIG. 2) towards the fixed film transporting unit 201 until the position detector 284 detects the horizontal bar 285 which is attached to the movable film transporting unit 202 and hence moves therewith.

Figure 11:
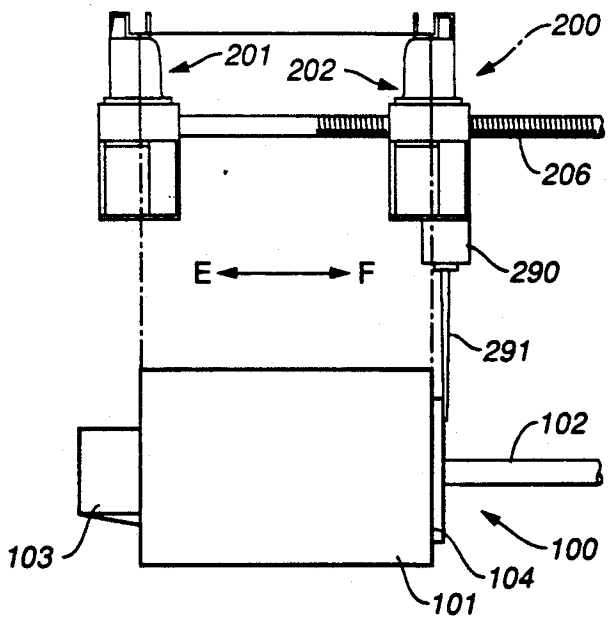
FIGS. 11-13 are schematic sectional side views of a mechanism shown as a portion of FIG. 2 according to different embodiments of the invention.

The particular embodiment described above of the mechanism for automatically adjusting the film transporting device 200 is not intended to limit the scope of the present invention. FIG. 11 shows another mechanism embodying the present invention characterized wherein a limit switch 290 is attached to the bottom of the movable film transporting unit 202 such that its contact piece 291 can come into contact with either the movable holder 104 or the film roll 101. If the amplitude of the oscillatory motion of the contact piece 291 exceeds a certain maximum value when the film roll 101 is replaced with a new one, the limit switch 290 outputs a signal which causes the screw shafts 206 to rotate and the movable film transporting unit 202 to move in the direction of the arrow F. A new film roll 101 may be installed in the meantime. As soon as the movable film transporting unit 202 reaches a predetermined right-hand position, the direction of rotation of the screw shafts 206 is reversed and the movable film transporting unit 202 begins to move in the direction of the arrow E and, when the contact piece 291 contacts either the newly installed film roll 101 or the side of the movable holder 104, the motion of the screw shafts 206 is stopped in response to a signal from the limit switch 290, thereby causing also the movable film transportation unit 202 to stop.

Figure 12:
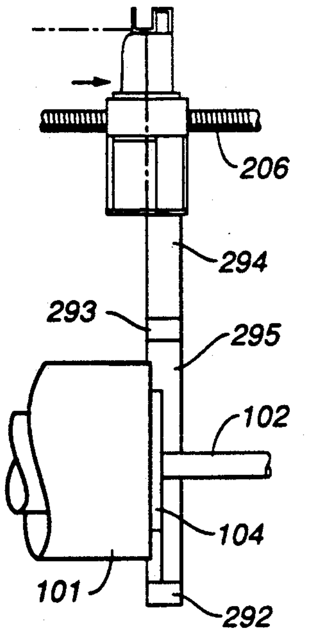

FIG. 12 is still another mechanism according to the present invention for the same purpose, characterized wherein use is made of a photosensor instead of a limit switch. Photosensors of various types such as the transmission type and the reflection type may be used for the purpose. FIG. 12 shows an example where use is made of a photosensor of the transmission type using a light emitter 292 and a light receiver 293. A vertical arm 294 is attached to the bottom surface of the movable film transporting unit 202 and a C-shaped arm 295 is attached to the lower end of this vertical arm 294. The light emitter 292 is attached to one end of the C-shaped arm 295 and the light receiver 293 is attached to the other end thereof such that light emitted from the light emitter 292 will be received by the light receiver 293 by traversing the space where the film roll 101 is set. The movable film transporting unit 202 according to this embodiment is so designed as to always stop at the position vertically corresponding to that of (or exactly above) the movable holder 104. Thus, if the movable holder 104 is moved in the direction of the arrow E in connection with the replacement of the film roll 101, the beam of light from the light emitter 292 which has been obstructed by the movable holder 104 is detected by the light receiver 293 and the screw shafts 206 begin to rotate in response thereto, causing the movable film transporting unit 202 to also move in the direction of the arrow E by following the motion of the movable holder 104. The movable film transporting unit 202 is also so designed that it stops at a position not reached by the movable holder 104 at its initial position if no film roll 101 is set in the roll supporting device 100. If a new film roll 101 is set thereafter, the beam of light from the light emitter 292 is obstructed by this film roll 101 and a signal emitted in response causes the screw shafts 206 to rotate in the reverse direction so as to move the movable film transporting unit 202 to move in the direction of the arrow F. When the movable film transporting unit 202 thereafter passes the set position of the movable holder 104 and the beam is detected again by the light receiver 293, the screw shafts 206 reverse the direction of their rotation, thereby beginning to move the movable film transporting unit 202 in the direction of arrow E. When the beam comes to be obstructed again by the movable holder 104 still thereafter, the rotation of the screw shafts 206 is stopped, causing the movable film transporting unit 202 to stop at a position vertically corresponding to that of (or exactly above) the movable holder 104.

If a photosensor of the reflection type is to be used, the surface of the roll bar 102 opposite to the photosensor may be prepared as a reflective surface, the movable film transporting unit being so designed as to stop at the boundary where the beam reflected by the roll bar 102 ceases to be detected.

Figure 13:
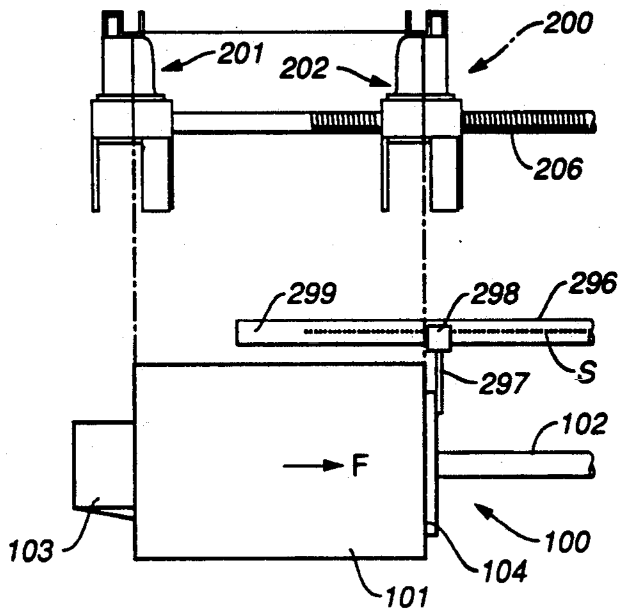

The two examples described above by way of FIGS. 11 and 12 are characterized wherein the film-clamping position of the film transporting device 200 (that is, the stopping position of the movable film transportation unit 202) is automatically adjusted according to the set position of the film roll 101 in the roll supporting device 100. The example shown in FIG. 13, by contrast, is characterized wherein the film-clamping position of the film transporting device 200 is automatically adjusted on the basis of the width of the film roll 101 set in the roll supporting device 100. As shown in FIG. 13, a scale beam 296 is set parallel to the roll bar 102 according to this example. A scale S, like a bar code repeating reflective and non-reflective lines at uniform intervals, is formed on the surface of the scale beam 296. The movable holder 104, on the other hand, is provided with an arm 297 extending from its side surface and a scanner 298 for detecting the striped reflective lines is attached to this arm 297 such that the scale S lies along the trajectory of this scanner 298 as the movable holder 104 is moved. The scale beam 296 has a totally reflective area 299 at the beginning end of the scale S and is so disposed that the scanner 298 is opposite this totally reflective area 299 when the movable holder 104 is at its initial position. When a film roll 101 is set in the roll supporting device 100 and the movable holder 104 is moved in the direction of the arrow F, the scanner 298 scans the scale S and outputs a pulse signal in response. The pulse signal is received by a counter (not shown) and counted thereby as an indicator of the distance by which the movable holder 104 has moved. The width of the set film roll 101 is calculated from the distance thus counted, the stopping position of the movable film transporting unit 202 is thereby determined, and the separation between the fixed and movable film transporting units 201 and 202 can be adjusted optimally corresponding to the width of the film 60.

Besides the examples described above, the mechanism may be so designed that not only the movable film transporting unit 202 but the fixed film transporting unit 201 is also movable such that its position always corresponds to that of the left-hand edge surface of the film roll 101.

With the film transporting device 200 thus structured according to the present invention, the film transportation units 201 and 202 can be automatically and constantly positioned optimally whenever a film roll of a different length is installed and hence the work efficiency can be improved.

Weighing Device

Figure 14:
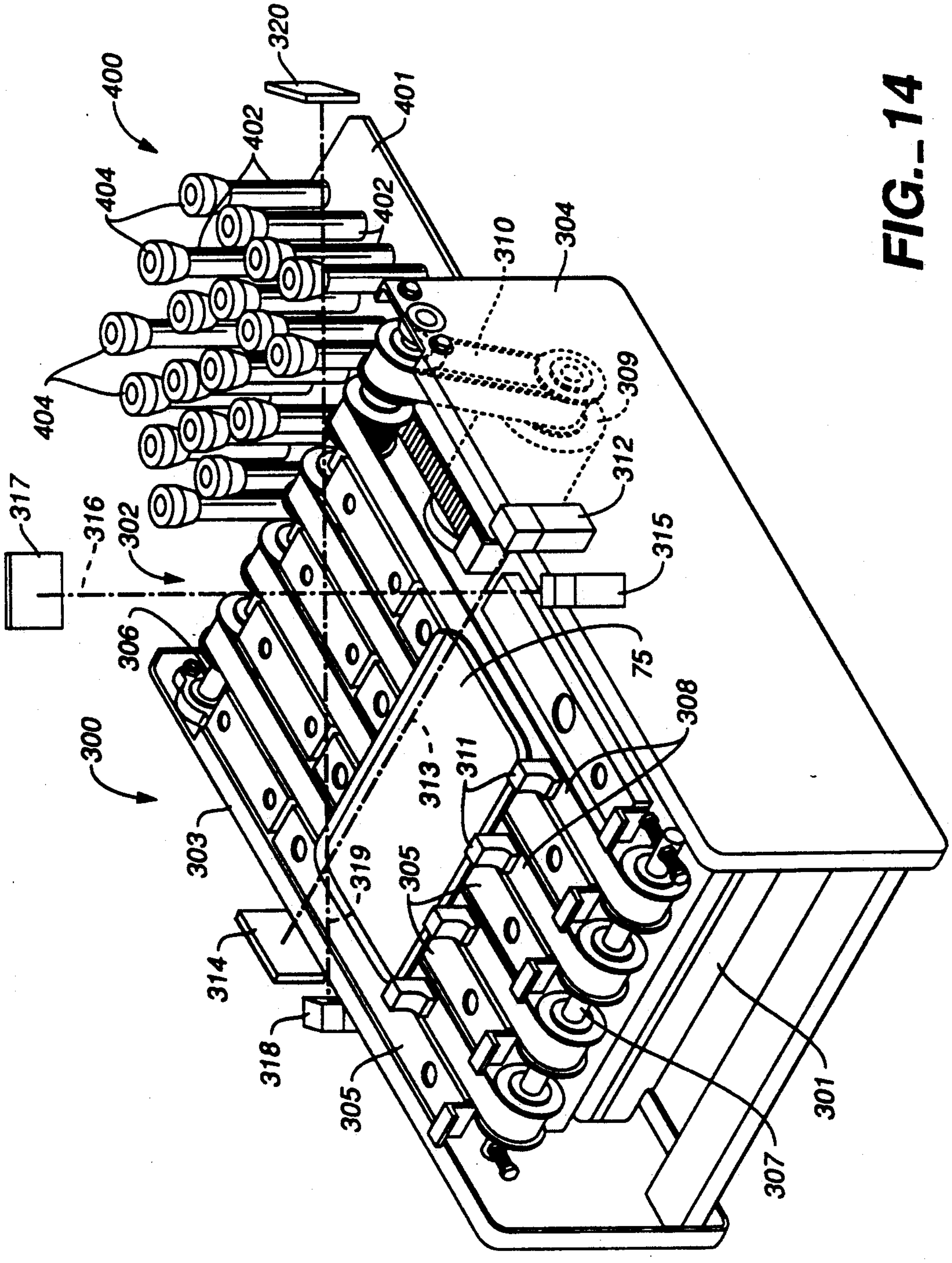
FIG. 14 is a diagonal view of the weighing device and the lifter.

As shown in FIG. 14, the weighing device 300 is composed essentially of a weighing machine 301 and a conveyor part 302 disposed above the weighing machine 301. The weighing machine 301 is disposed between a left-hand frame 303 and a right-hand frame 304 and serves to weigh an object (not shown in FIG. 14) on the tray 75. A plurality of elongated, stripe-like, vertically movable weighing plates 305 are disposed between the left-hand and right-hand frames 303 and 304 at regular intervals and connected through appropriate means to the upper surface of the weighing machine 301 such that the weight of an object (such as the tray 75 loaded with an item 70 to be weighed and packaged) placed on these weighing plates can be measured by the weighing machine 301. The conveyor part 302 includes a drive shaft 306, a driven shaft 307 disposed at a certain distance away from the drive shaft 306, and a plurality of conveyor belts 308 stretched over between the drive shaft 306 and the driven shaft 307 so as to be individually between the elongated weighing plates 305. The drive shaft 306 is connected to a stepping motor 309 through a timing belt 310 so as to cause these conveyor belts 308 to move uniformly and transport the tray 75 over the weighing plates 305 in the direction towards the lifter 400. These conveyor belts 308 are provided with pushers 311 aligned transversely with respect to the direction of motion of the conveyor belts 308 for pushing the tray 75 from behind.

On one side of the conveyor part 302 with respect to the direction of motion (or the transportation path) of the conveyor belts 308, there is a first optical detector 312 of the active type for detecting an object by a change in the intensity of reflected light, disposed in such a way that its optical axis 313 traverses the transportation path perpendicularly. Symmetrically opposite from the first optical detector 312 on the other side of the conveyor part 302, there is a first reflective plate 314, disposed such that its reflective surface is perpendicular to the optical axis 313 of the first optical detector 312 and hence that light from the first optical detector 312 is reflected back. When there is no object on the optical path 313 to obstruct the propagation of light from the first optical detector 312, the emitted light from the first optical detector 312 is directly reflected back. If this optical axis 313 becomes obstructed, the intensity of light received by the first optical detector 312 is reduced due to scattering. Existence of an object on the optical axis 313 is thus detected by a change in the intensity of received reflected light.

On the upstream side of the first optical detector 312 on the same side of the conveyor part 302, there is a second optical detector 315 of the same kind disposed with its optical axis 316 directed diagonally across the transportation path. A second reflective plate 317 is disposed on the opposite side of the conveyor part 302 and on this optical axis 316 such that its reflective surface is perpendicular thereto. According to the embodiment of the present invention shown in FIG. 14, furthermore, a third optical detector 318 of the same kind is disposed nearly symmetrically opposite from the second optical detector 315 with respect to the conveyor part 302. The third optical detector 318 is so disposed that its optical axis 319 is directed also diagonally across the transportation path. On the same side of the conveyor part 302 as the first and second optical detectors 312 and 315 and on the optical axis 319 of the third optical detector 318, there is a third reflective plate 320 disposed in such a way that its reflective surface is perpendicular to the optical axis 319 of the third optical detector 318.

After a tray 75 loaded with an item or items 70 and placed on the weighing plates 305 is weighed with the weighing device 300, the tray 75 is pushed by the pushers 311 which move with the conveyor belts 308 and slides over the weighing plates 305 to be transported to the lifter 400. The method of operating this weighing device 300 will be described more in detail below in connection with the description of the control device 800.

Lifter

Figure 15:
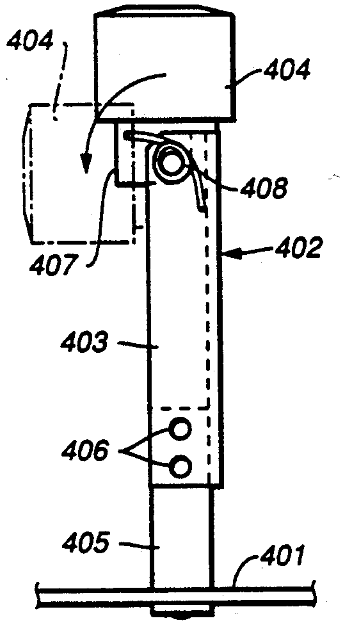
FIG. 15 is a side view of a leg which is a part of the lifter.

The lifter 400 is for receiving from the weighing device 300 a tray 75 loaded with an item or items 70, which has been weighed, and lifting it to the packaging station 500 above the lifter 400. The lifter 400 is composed basically of a lifter base 401 which can be lifted by a mechanism to be described below and a plurality of legs 402 standing on the upper surface of the lifter base 401. These legs 402 serve to support the loaded tray 75 brought to the lifter 400 from the weighing device 300. As shown in FIG. 15 more in detail, each of these legs 402 is composed of an elongated support member 403 having an approximately U-shaped cross-section and a support head 404 which is rotatably attached to the top end of the support member 403 so as to be able to bend in a manner of bowing. The bottom end of the support member 403 engages with a base block 405 which is secured to the lifter base 401. The leg 402 stands straight up by having the support member 403 fastened to the base block 405 by means of screw means 406. The support head 404 has a bracket 407 attached to its lower surface. This brackets 407 engages with the top end of the support member 403 and is connected therewith through a pin 408 such that the support head 404 can rotate around the pin 408 to assume either an upward position shown by solid lines or a bent (by 90°) position shown by broken lines in FIG. 15.

The lifter base 401 is vertically moved upward and downward, as shown in FIG. 1, by means of a cam 409 which is rotated by means of a driving means (not shown) and a linking mechanism 410. At the lowest point of this up-and-down motion, the lifter base 401 is so positioned that the upper surface of the support heads 404 is nearly flush with the upper surface of the conveyor belts 308 of the weighing machine and that the loaded tray 75 can be smoothly transferred onto the top of these support heads 404. The cam 409 and the linking mechanism 410 lift up the loaded tray 75 from this lowest point until the item 70 on the tray 75 presses from below the film 60 stretched between the fixed and movable film transporting units 201 and 202.

Figure 16:
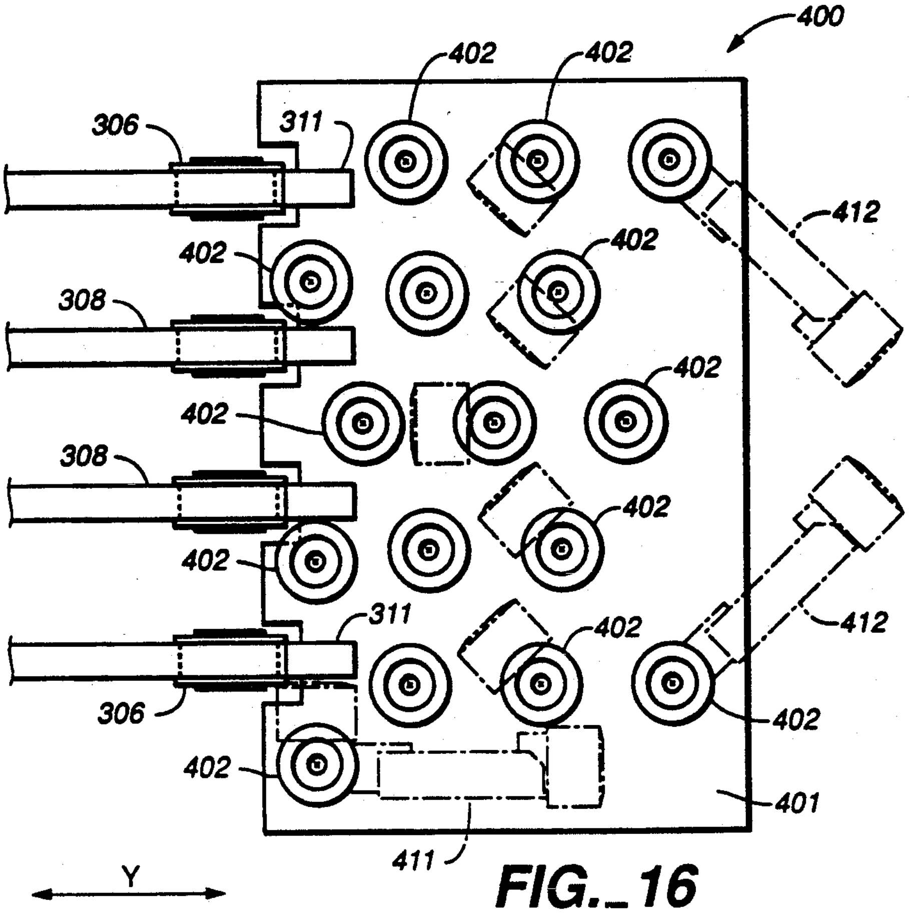
FIG. 16 is a plan view of the lifter.

As shown in FIG. 16, the legs 402 (and also those indicated by numerals 412) on the lifter base 401 are arranged approximately in five rows (in the direction in which the loaded tray 75 is brought from the weighing machine 300 to the lifter 400) of three legs each. For the purpose of explanation, the top row in FIG. 16 will be herein referred to as the first row, the bottom row as the fifth row, and so forth. The legs 402 and 412 in individual rows form zigzagged arrays as shown, the three legs 402 and 412 of the first, third and fifth rows being farther removed from the weighing device 300 than those of the second and fourth rows. In addition, there is a collapsible leg 411 outside the fifth row and proximal to the weighing device 300. Of the three legs in the first and fifth rows, the ones farthest from the weighing device 300 are also collapsible and are indicated by numerals 412 in order to distinguish from the others.

Figure 17:
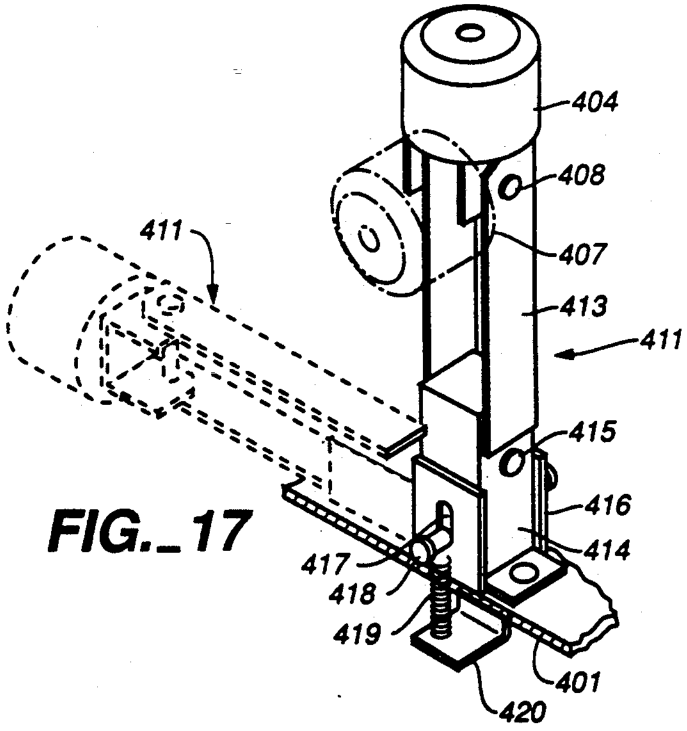
FIG. 17 is a diagonal view of the collapsible leg.

The collapsible legs 411 and 412 are structured as shown in FIG. 17, having an elongated supporting member 413 with a connector block 414 attached to its lower end by a screw means 415. A generally U-shaped piece 416 with vertically elongated holes 417 on both sides is affixed to the lifter base 401. As the connector block 414 is inserted into this U-shaped piece 416, a pin 418 penetrates the connector block 414 through both of the elongated holes 417. Tensile springs 419 are stretched through the lifter base 401 and between the ends of the pin 418 and a piece 420 attached to the bottom surface of the lifter base 401 such that the connector block 414 and the supporting member 413 are pulled towards the U-shaped piece 416. When the leg 411 (or 412) is standing the bottom surface of the U-shaped piece 416 makes a surface-to-surface contact to keep the leg 411 (or 412) in an erected position shown by solid lines. If the supporting member 413 and the connector block 414 are lifted against the biasing force of the springs 419, the leg 411 (or 412) can be collapsed to assumed the collapsed position shown by dotted lines. The support head 404 of the collapsible leg 411 (or 412) can also be bent in the same manner of bowing as indicated by dotted lines. The direction in which the collapsible leg 411 (or 412) can be collapsed and that in which its support head 404 can be bent make an angle of 90.

These collapsible legs 411 and 412 are made collapsible so that, depending on the size of the tray 75 to be supported and lifted by the lifter 400, interference between the legs 402 of the lifter 400 and other components can be avoided. The directions in which the support heads 404 bend will be described below more in detail in connection with the folding device 600. In FIG. 7, numeral 421 indicates one of a pair of object detection sensors (the other of the pair not shown) and numerals 422 indicate a pair of optical sensors (to be herein referred to as film detection sensors) for detecting the presence of the film 60 at the packaging station 500 and supported at fixed positions by appropriate means (not shown). These sensors 421 and 422 may included as parts of the lifter 400 according to another embodiment of the invention. Manners in which these sensors 421 and 422 are used and in which the lifter 400 may be operated will be described below in connection with the description of the control device 800.

Folding Device

Figure 18:
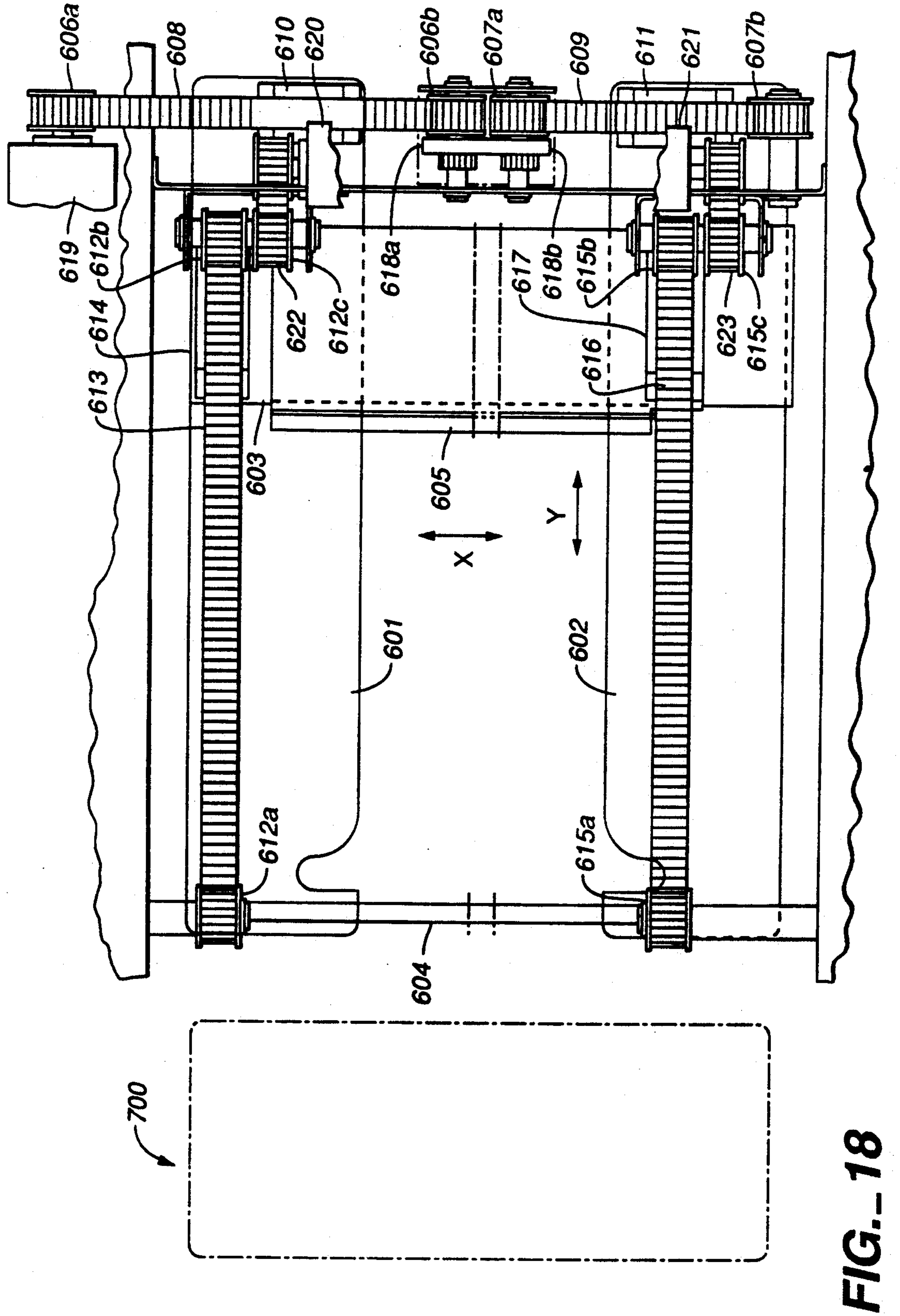
FIG. 18 is a sectional view taken along the line 18—18 of FIG. 7.

The folding device 600 is for using the film sheet 60 transported by the film transporting device 200 to the packaging station 500 to make a package out of the loaded tray 75 brought to the packaging station 500 by the lifter 400. As shown in FIGS. 7 and 18, the folding device 500 is composed essentially of a pair of side folding plates 601 and 602, a back folding plate 603, a folding bar 604, a discharge pusher 605 and mechanisms for operating them. To operate the pair of (left-hand and right-hand) side folding plates 601 and 602, two pairs of (left-hand and right-hand) timing pulleys (**606*a* and 606*b*) and (607*a* and 607*b*) are supported at the back of the main housing 51 and timing belts 608 and 609 are stretched respectively over these pairs of timing pulleys (606*a* and 606*b*) and (607*a* and 607*b*). The back edges of the side folding plates 601 and 602 are attached respectively to the downwardly facing surfaces of the timing belts 608 and 609 through brackets 610 and 611. The main housing 51 also supports another pair of timing pulleys 612*a* and 612*b* between which a timing belt 613 is stretched in the directions (shown by the arrows Y in FIG. 18, and also the direction of the width of the film 60) perpendicular to the direction in which the film 60 is transported to the packaging station 500. The back folding plate 603 is similarly attached to the downwardly facing surface of the timing belt 613 through a bracket 614. Still another pair of timing pulleys 615*a* and 615*b* is affixed opposite to the pair of timing pulleys 612*a* and 612*b* and still another timing belt 616 is stretched therebetween. The discharge pusher 605 is similarly attached to the downwardly facing surface of this timing belt 616 through still another bracket 617. The folding bar 604 is supported by the main housing 51 at both ends and is disposed above the front ends of the side folding plates 601 and 602. The timing pulleys 606*b* and 607*a* are in a motion-communicating relationship through a pair of gears 618*a* and 618*b*. The timing pulley 606*a* is connected to a motor 619 such that the two timing belts 608 and 609 advance in opposite directions, causing the two side folding plates 601 and 602 to move selectably towards or away from each other (in the directions of the arrows X). Similarly, timing pulleys 612*c* and 615*c*, which are respectively supported coaxially to the pulleys 612*b* and 615*b*, are connected to individual motors 620 and 621 respectively through timing belts 622 and 623 such that the back folding plate 603 and the discharge pusher 605 can be moved independently in the direction of the width of the film 60 shown by the arrows Y in FIG. 18. With the folding device 600 thus structured, these folding plates 601, 602 and 603 push the film 60 in the stretched condition shown by dotted lines in FIG. 7, folding the side and back edge parts of the film 60 downward towards the bottom surface of the tray 75 and the discharge pusher 605 pushes the tray 75 forward. As the tray 75 moves forward, the front edge part of the film 60 is folded by the folding bar 604 towards the bottom surface of the tray 75. The discharge pusher 605 pushes the tray 75 forward still further to the sealing device 700. In FIGS. 1 and 7, numeral 624 indicates a pair of rotatably supported means for contacting the top surface of the packaged item 70** to prevent it from floating upward excessively.

Figure 19:
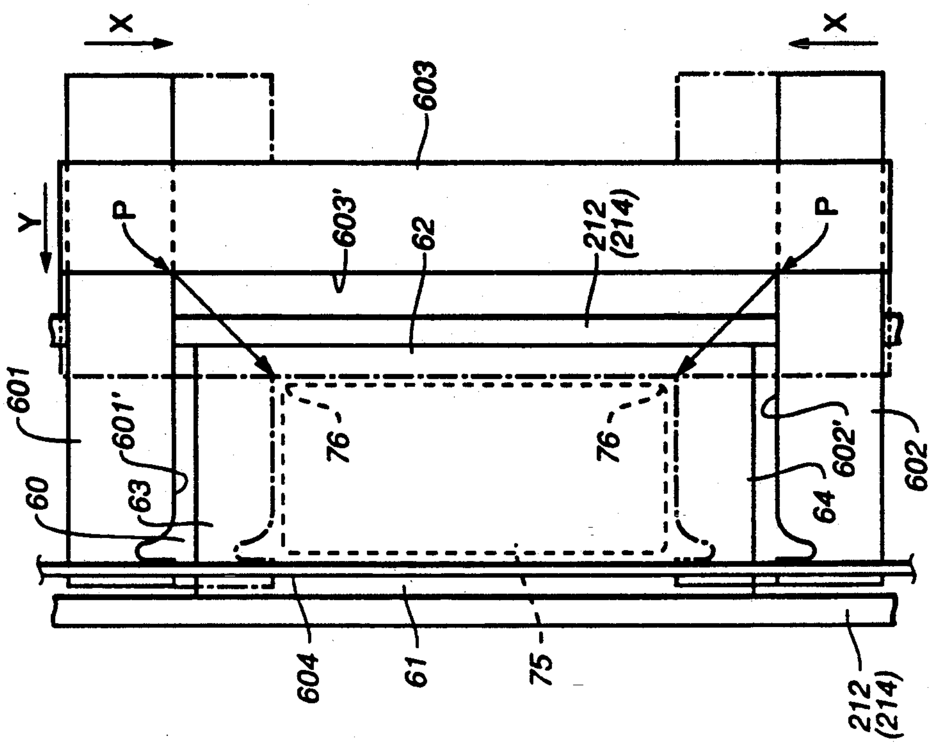

According to the present invention, the control device 800 is so designed as to allow the user to input the dimensions of the tray 75 and to accordingly control the operations of the folding plates 601, 602 and 603 and the discharge pusher 605 as well as the timing of these operations. The manner in which the folding device 600 of the present invention is intended to function will be explained next with reference to FIG. 19 which shows the loaded tray 75 about to be wrapped around at the packaging station 500. In FIG. 19, the film 60 has its front edge section 61 and back edge section 62 clamped by the upper and lower transport belts 212 and 214 of the fixed and movable film transporting units 201 and 202, respectively, as it has been brought to the packaging station 500. After the loaded tray 75 is lifted from under the stretched film 60 to the height indicated in FIG. 7, the left-hand and right-hand side folding plates 601 and 602 are moved towards each other (as shown by the arrows X) and the back folding plate 603 is moved forward (as shown by the arrow Y in FIG. 19) to the positions indicated by dotted lines. The points (indicated by P in FIG. 19), where the inner edges 601′ and 602′ respectively of the left-hand and right-hand side folding plates 601 and 602 cross the forward edge 603′ of the back folding plate 603, are controlled to move as indicated by the diagonal arrows in FIG. 19 to reach the corners 76 of the tray 75 such that the film 60 will be folded neatly without slackening or wrinkling. Such slackening and/or wrinkling of the film is likely to take place if the folding plates 601, 602 and 603 are moved such that the crossing points P do not correctly pass the corner points 76 of the tray 75.

Figure 20:
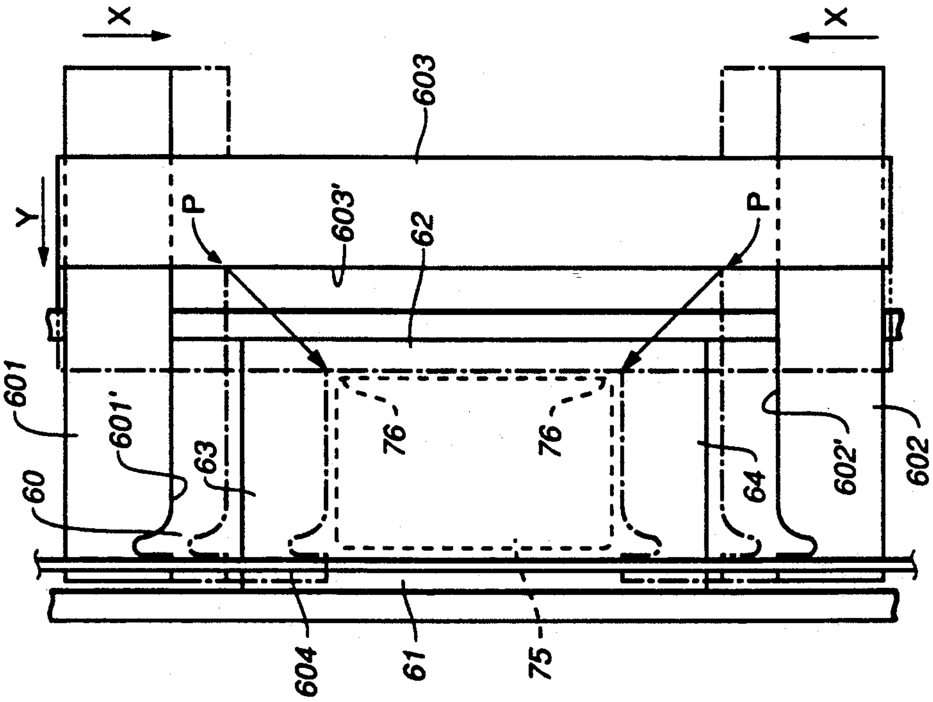
FIGS. 19 and 20 are schematic plan views of a loaded tray at the packaging station to show the operation of the folding device.

If the dimension of the tray 75 in the direction of the arrows X has changed as shown in FIG. 20, the control device 800 adjusts the timing of operation of the motors 619 and 620 such that the left-hand and right-hand side folding plates 601 and 602 are moved first and after these side folding plates 601 and 602 have moved a little in the directions of the arrows X as shown by dotted lines, the back folding plate 603 moves in the direction of the arrow Y. The side folding plates 601 and 602 and the back folding plate 603 then move further inward such that the points P will move as indicated by the diagonal arrows to reach the corners 76 of the tray 75 such that the film 60 will be folded neatly without slackening or wrinkling. Thereafter, as explained above with reference to FIG. 19, the forward edge portion 61 of the film 60 is folded by the folding bar 604 as the tray 75 is pushed forward by the discharge pusher 605.

Figure 21:
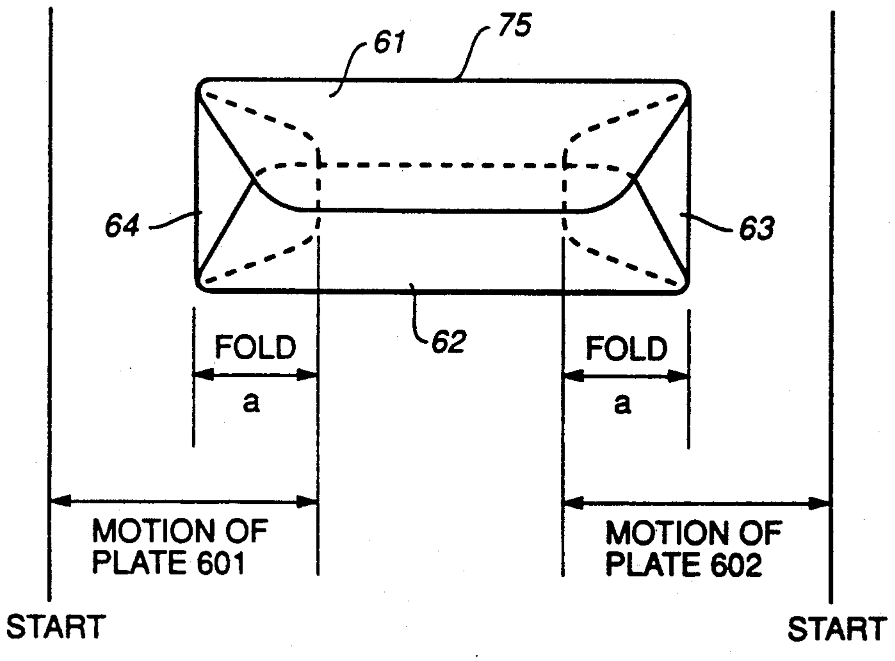
FIGS. 21 and 22 are back views of trays for showing the controlled operations of the folding plates.
Figure 22:
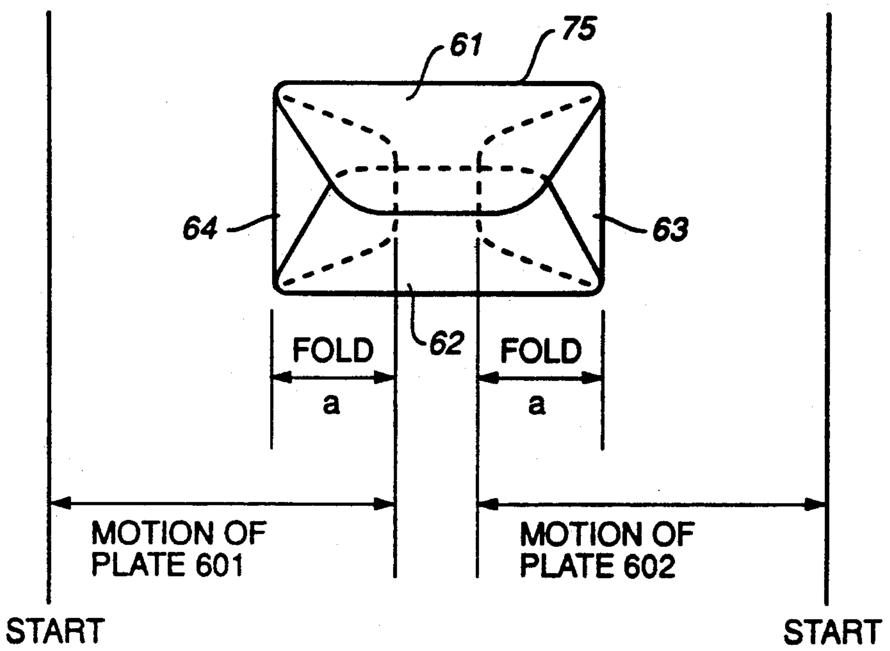

As explained above, the control device 800 adjusts the motion of the side folding plates 601 and 602 according to the size of the tray 75 such that, for example, the left-hand and right-hand side edge portions 63 and 64 of the film 60 can be folded by the side folding plates 601 and 602 always by a constant amount a as shown in FIGS. 21 and 22 independently of the transverse dimension (left-to-right) of the tray 75. This may be accomplished, as explained above by way of FIGS. 19 and 20, by starting the inward motions of the side folding plates 601 and 602 sooner if the transverse dimension of the tray 75 is smaller. If the side folding plates 601 and 602 move towards each other excessively over the length a by which the film 60 is folded, however, this may easily cause the film 60 to become wrinkled. In order to avoid this, the control device 800 according to a preferred embodiment of the present invention causes the side folding plates 601 and 602 to reverse the directions of their inward motions and to start returning to their starting positions when the folding (by the distance a) of the film 60 is expected to have been completed. As may be understood from FIGS. 21 and 22, the time at which the directions of motions of the side folding plates 601 and 602 are reversed will be delayed if the tray 75 is smaller (in the transverse direction). With the motion of the side folding plates 601 and 602 thus controlled, the front and back edge sections 61 and 62 of the film 60 can be reliably prevented from getting pulled in excessively when the side folding plates 601 and 602 are operated. Generation of wrinkles in the film 60 extending from the corners 76 of the tray 75 in the direction of the folding can also be prevented. In summary, the control device 800 adjusts the motion of the folding plates 601, 602 and 603 in such a way that the crossing points P will be certain to pass through the corners 76 of the tray 75. Sensors for detecting the size of the tray 75 may be provided in such a way that the modes of operating the motors 619, 620 and 621 are controlled according to the signal indicative of the size of the tray 75 outputted from these sensors.

Next, the collapsing of the legs 411 and 412 and the bending of the support heads 404 of the lifter 400 will be explained more in detail. As explained above, the lifter 400 serves to receive from the weighing device 300 a loaded tray 75 and to lift it to the packaging station 500. At the packaging station 500, the lifter 400 presses the item 70 to be packaged upward against the film 60 stretched between the fixed and movable film transporting units 201 and 202 in the direction of its width. While the loaded tray 75 is thus being supported on top of the support heads 404 of the legs 402, the folding plates 601, 602 and 603 push the side and back edge sections of the film 60 and fold them towards the bottom surface of the tray 75 by pushing these edge sections of the film 60 between the bottom surface of the tray 75 and the support heads 404 of the legs 402. For this reason, those of the support heads 404 in peripheral areas of the base 401 are made to bend towards the center of the base 401 such that these folding plates 601, 602 and 603 can easily push the edge sections of the film 60 towards the bottom surface of the tray 75. This is illustrated in part by dotted lines in FIG. 16. In other words, the support heads 404 of the legs 402 and 412 of the first and second rows (with reference to FIG. 16) are made to bend in a diagonal direction both towards the center of the lifter base 401 and towards the sealing device 700. Similarly, the support heads 404 of the legs 402 and 412 of the fourth and fifth rows are made to bend in another diagonal direction towards the center of the lifter base 401 and the sealing device 700. The support heads 404 of the legs 402 of the third row which are on a center line of the lifter base 401 are made to bend in the direction of motion of the discharge pusher 605 directly towards the sealing device 700. The support head 404 of the collapsible leg 411 outside the fifth row is made to bend towards the center of the lifter base 401 in the direction of motion of the side folding plate 602.

Figure 23:
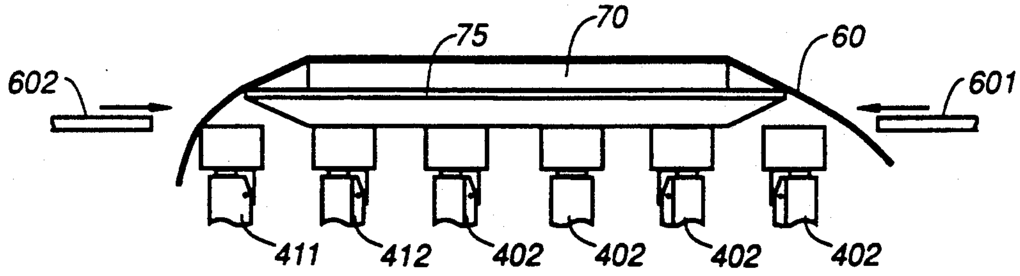
FIGS. 23 and 24 are schematic side views of a tray at the packaging station for explaining the packaging process.
Figure 24:
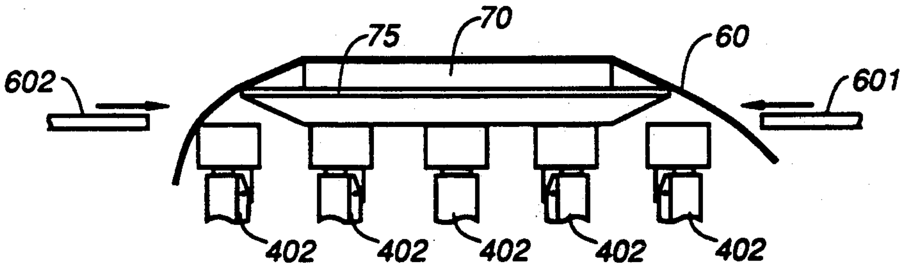
Figure 25:
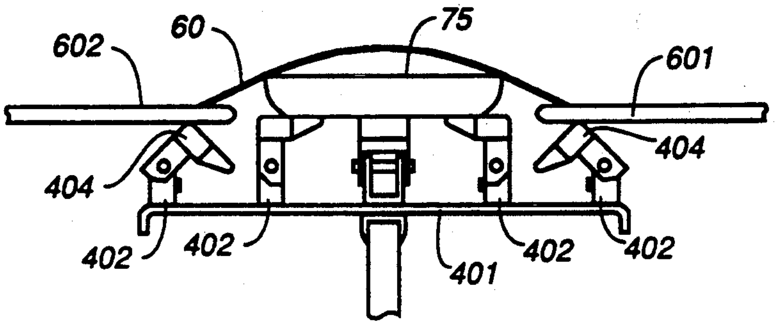
FIG. 25 is a schematic side view of a relatively narrow tray at the packaging station if the collapsible legs of the lifter are not collapsed.

The collapsible legs 411 and 412 are collapsed and in lying position or raised and in erect position according to the size of the tray 75 to be carried and lifted by the lifter 400. If the tray 75 is relatively large, the collapsible legs 411 and 412 are raised to erect positions as shown by solid lines in FIGS. 16 and 17 and also in FIG. 23 and are made to participate in the supporting of the tray 75 together with the other (non-collapsible) legs 404. If the tray 75 is somewhat smaller, however, these collapsible legs 411 and 412 are laid down as shown by dotted lines in FIGS. 16 and 17 and also in FIG. 24. Advantages which can be attained by laying down these collapsible legs 411 and 412 include the following.

A device according to the present invention for measuring longitudinal and transverse dimensions of an object while it is in motion may be characterized as having light emitters which emit light diagonally across the path of this moving object and light detectors for receiving reflected light from these light emitters. The distance traveled by the object until specified corners of the object are detected by these light detectors is used to determine the desired dimensions.

The distribution pattern of collapsible and noncollapsible collapsible legs 402, 411 and 412 shown in FIG. 16 is not intended to limit the scope of the present invention. Any appropriate distribution pattern may be adopted. In the pattern shown in FIG. 16, the collapsible legs 412 on the first and fifth rows serve to reduce the tension in the film 60 mainly at its front and back edge sections 61 and 62 when the film 60 is small.

Sealing Device

The sealing device 700 is disposed above the weighing device 300 and in front of the packaging station 500 and is for thermally sealing the edge sections 61, 62, 63 and 64 of the film 60 which have been folded towards the bottom of the tray 75 by the folding device 600. As shown in FIG. 7, the sealing device 700 is comprised essentially of a heater 701 enclosed by a housing structure 702 for thermally sealing the film 60 folded towards the bottom surface of the tray 75 and a plurality of freely rotatable roller members 703 disposed on the upper surface of the housing structure 702. As shown in FIGS. 1 and 7, the side parts of this housing structure 702 are rotatably supported by the main housing 51 through a pair of support shafts 704 such that the sealing device 700 as a whole can be lifted from its position shown by solid lines in FIG. 7 to a retracted position at an elevated part inside the main housing 51 shown by broken lines (also in FIG. 7). A sealer position sensor 705 is attached to the main housing 51 at an appropriate position for detecting the retracted condition of the sealing device 700. The sealer position sensor 705 may comprise a limit switch or an optical sensor.

Operations of the control device 800 according to a signal received from this sensor 705 will be described below in detail in connection with the description of the control device 800.

Control Device

Figure 26:
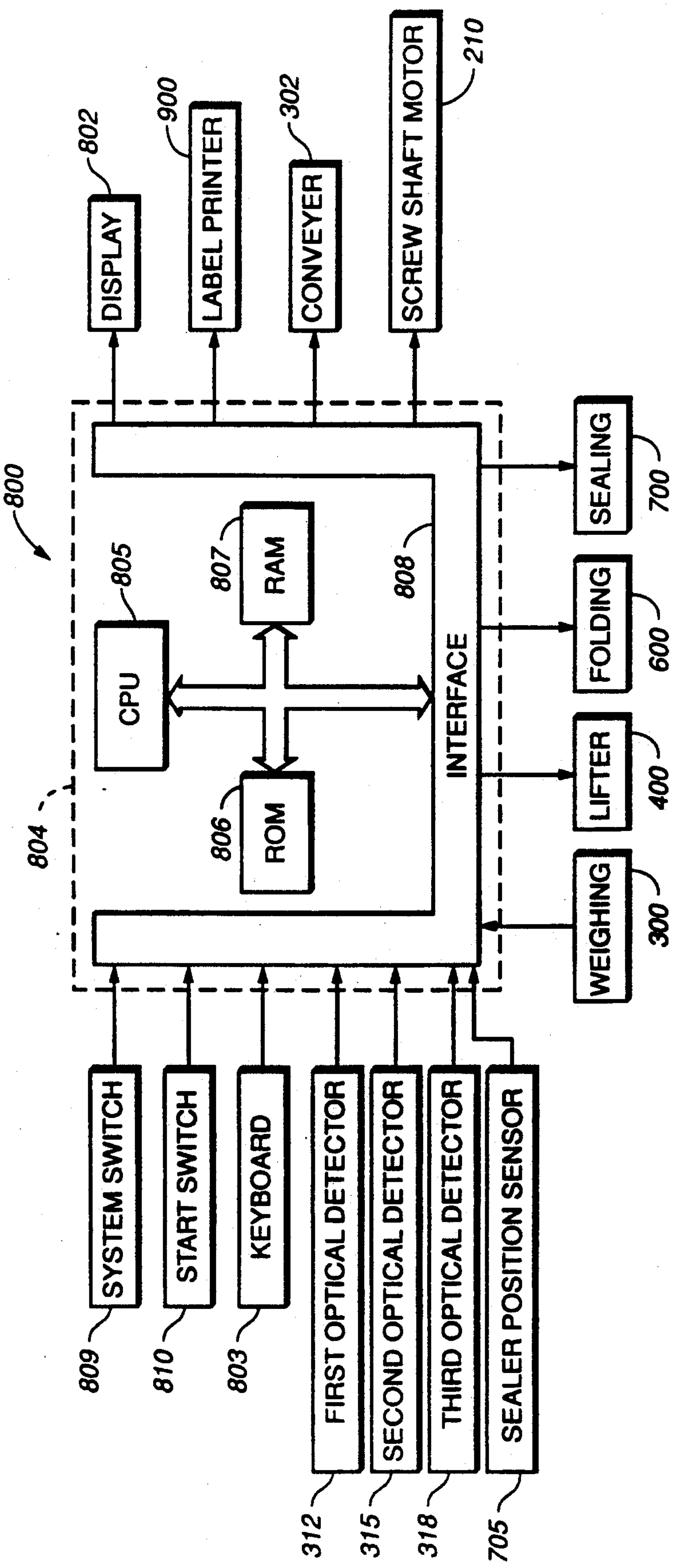
FIG. 26 is a block diagram of the weighing device relative principally to the operation of the weighing device.

The control device 800 is comprised of a console box 801 with a display device 802 and a keyboard 803 with command keys and number keys to serve as a key-input means. As schematically shown in FIG. 26, the console box 801 contains a control unit 804 including a central processing unit (CPU) 805 with which the control device 800 controls the operations of the film transporting device 200, the weighing device 300, the lifter 400, the folding device 600 and the sealing device 700 besides calculating the price of the packaged product. The control unit 804 also include a read-only memory device (ROM) 806 storing operation programs, a random-access memory device (RAM) 807 for temporarily storing the results of operations and data of various types and an input-output interface 808. Signals of various types such as those from the keyboard 803, a system switch 809 for switching the entire system on and off and a start switch 810 for starting the operation of the apparatus 50 are received by the CPU 805 through the interface 808. The CPU 805 also serves to retrieve various data from the ROM 806 and the RAM 807 to display on the display device 802 and to exchange data with the weighing device 300, calculating the price of a packaged product on the basis of a weight signal received therefrom, storing the price data thus obtained at certain areas of the RAM 807 and having the price printed on a label by the label printer 900.

In what follows, operations of the CPU 805 of the control unit 804 embodying various aspects of the present invention will be described separately.

Control of the Weighing Device

As shown in FIG. 26, the CPU 805 is adapted to receive detection signals from the first, second and third optical detectors 312, 315 and 318 through the interface 808 and not only calculates the longitudinal and transverse dimensions of the tray 75 on the conveyor belts 308 on the basis of these signals but also determines the size to which the film 60 is to be cut.

Figure 27:
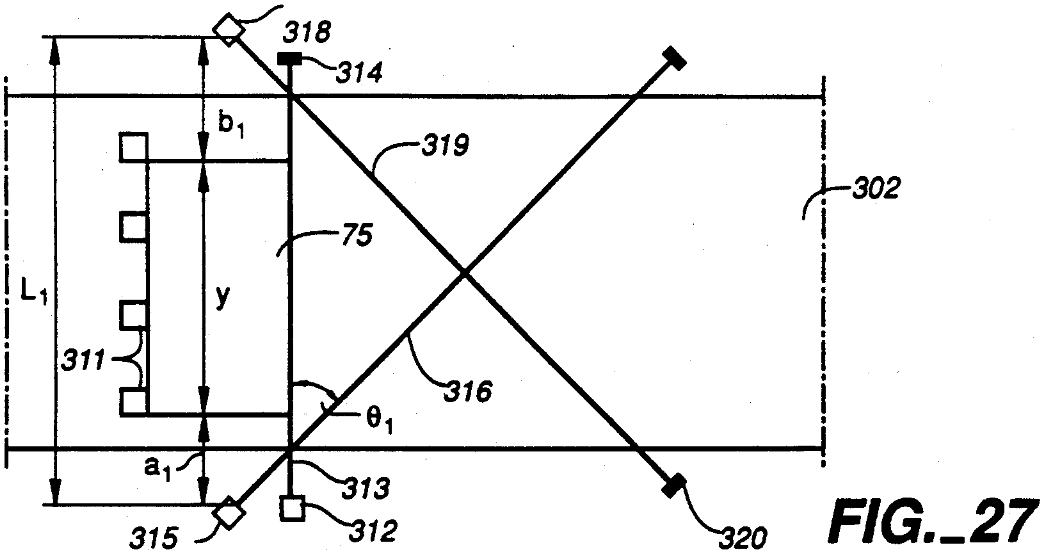
FIGS. 27-30 are schematic plan views of the tray on the conveyor belts of the weighing device for showing the operation of the CPU to determine the dimensions of the tray.

As shown in FIG. 27, let $L_1$ indicate the distance between the second and third optical detectors 315 and 318 disposed symmetrically on opposite sides of the conveyor belts 308, $a_1$ the distance between the second optical detector 315 and the side of the tray 75 proximal thereto, $b_1$ the distance between the third optical detector 318 and the other side (distal from the second optical detector 315) of the tray 75, and y the width of the tray 75 (that is, the length of its side in the direction transverse to the direction of motion of the conveyor belts 308) such that $L_1=y+a_1+b_1$. Since $L_1$ is presumed known, the value of y can be derived if the values of $a_1$ and $b_1$ are determined.

Figure 28:
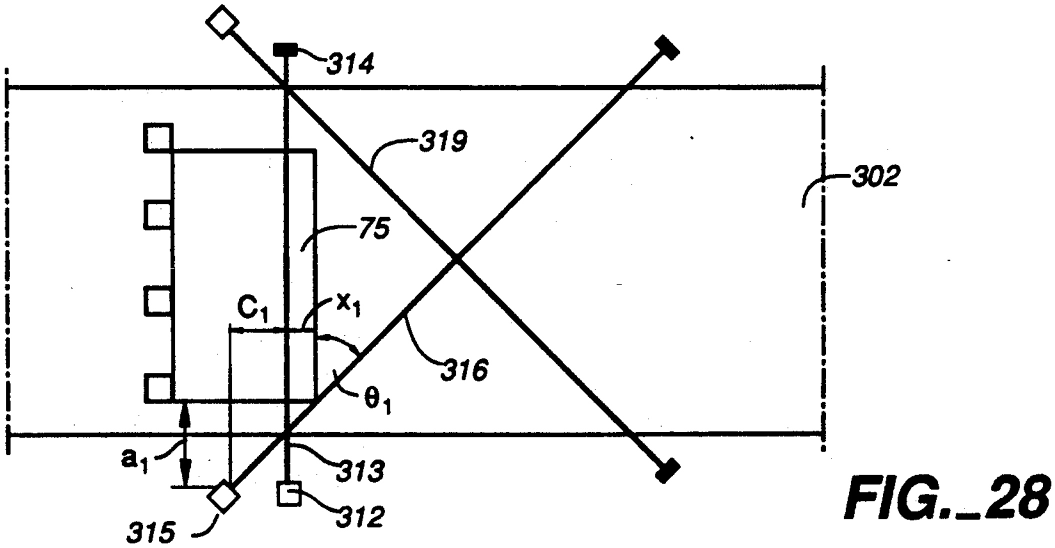

Next, let $t_1$ be the time at which the front edge of the tray 75 crosses the optical axis 313 of the first optical detector 312 as shown in FIG. 27 and $t_2$ the time at Which one of the front corners of the tray 75 crosses the optical axis 316 of the second optical detector 315 as shown in FIG. 28. Then, the distance $x_1$ traveled by the tray 75 in the meantime is obtained as $x_1=v(t_2-t_1)$ where v is the speed of the conveyor belts 308. Since the conveyor belts 308 are driven by the stepping motor 309 as explained above, the value of v is proportional to the pulse number outputted to the stepping motor 309 and presumed known.

If $\Theta_1$ indicates the angle between the optical axes 313 and 316 of the first and second optical detectors 312 and 315, $a_1=(c_1+x_1)/\tan\Theta_1$ where $c_1$ is the distance between the first optical detector 312 and the second optical detector 315 in the direction of motion of the conveyor belts 308.

Figure 29:
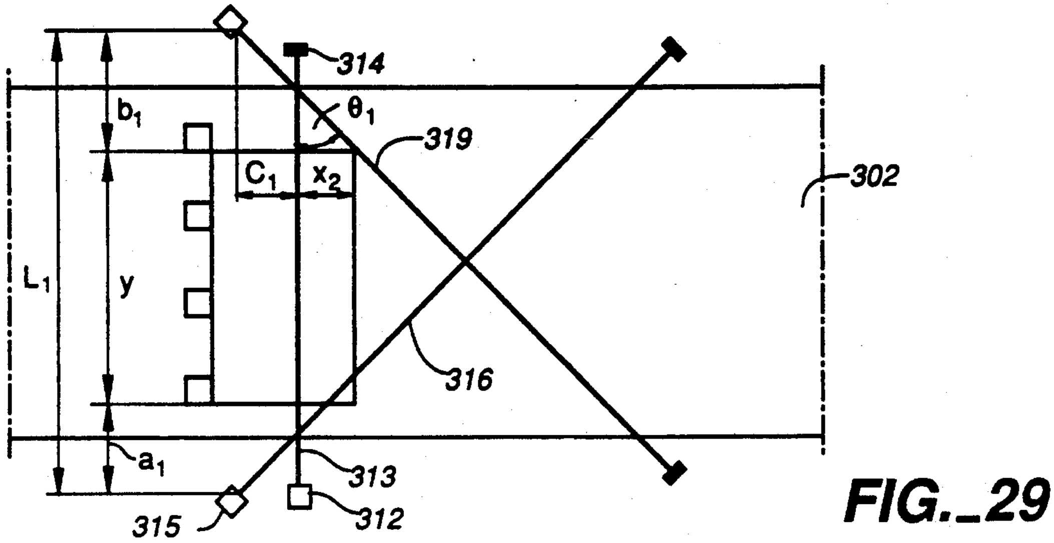

Let $t_3$ be the time still later when the other front edge of the tray 75 crosses the optical axis 319 of the third optical detector 318 as shown in FIG. 29. The distance $x_2$ traveled by the tray 75 between times $t_1$ and $t_3$ is similarly obtained by $x_2=v(t_3-t_1)$ and, if the third optical detector 318 is oriented symmetrically to the second optical detector 315, $b_1=(c_1+x_2)/\tan\Theta_1$. One thus obtains from the above $y=L_1-(2c_1+x_1+x_2)/\tan\Theta_1$. Data indicative of this functional relationship and the values v, $L_1$ and $c_1$ are stored in the ROM 806 of the control unit 804 and the CPU 805 is programmed to measure $t_1$ and $t_2$ on the basis of inputs from the optical detectors 312, 315 and 318 and to calculate therefrom the width y of the tray 75 by using these data stored in the ROM 806.

Figure 30:
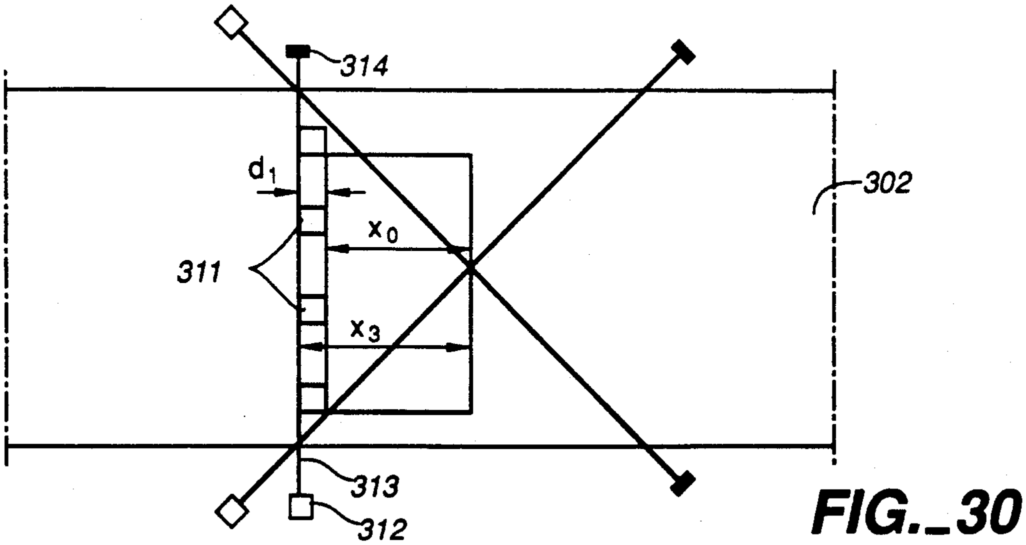

Let $t_4$ be the time still later when the pushers 311 of the weighing device 300 have just finished crossing the optical axis 313 of the first optical detector 312 as shown in FIG. 30. At this moment, the emitted light from the first optical detector 312 is suddenly reflected back thereto from the first reflective plate 314 and this signals the occurrence of the condition depicted in FIG. 30. If $x_3$ indicates the distance traveled by the tray 75 between times $t_1$ and $t_4$ and $d_1$ indicates the thickness of the pushers 311 (as measured in the direction of motion of the conveyor belts 308), the length $x_0$ of the tray 75 (that is, the length of its side in the direction of motion of the conveyor belts 308) is obtained by $x_0=x_3-d_1$. Data indicative of this functional relationship and the value $d_1$ are also stored in the ROM 806 and the CPU 805 is also programmed to measure $t_1$ and $t_4$ and to calculate therefrom the value of $x_0$. In summary, the dimensions y and $x_0$ of the tray 75 can be accurately determined according to the present invention without requiring a large number of sensors.

The particular, manner described above in which the dimensions of the tray 75 being transported through the weighing device 300 are determined is not intended to limit the scope of the present invention. According to another embodiment of the invention illustrated in FIGS. 31 and 32, an active-type first optical detector 312' is disposed at one side of the conveyor belts 308 with its optical axis 313' perpendicularly traversing the direction of motion of the conveyor belts 308. A first reflective plate 314' is disposed on this optical axis 313' and on opposite side of the conveyor belts 308, having its reflective surface oriented perpendicularly to the optical axis 313′. An active-type second optical detector 315′ with an optical axis 316′ and a second reflective plate 317′ with a reflective surface are similarly disposed with respect to the active-type first optical detector 312′ as the second optical detector 315 and the second reflective plate 317 were disposed with respect to the first optical detector 312 in the embodiment illustrated in FIG. 27. According to this embodiment, the weighing device 300 is additionally provided with a guide plate 321 extending parallel to the direction of motion of the conveyor belts 308 and on the side distal from the optical detectors 312′ and 315′ such that one side of the tray 75 slides against this guide plate 321 as it is transported on the conveyor belts 308 towards the lifter 400. If $L_2$ indicates the distance between the guide plate 321 and the optical detectors 312′ and 315′ in the direction perpendicular to the direction of motion of the conveyor belts 308, $a_2$ the distance between the optical detectors 312′ and 315′ and the side of the tray 75 distal from the guide plate 321 and y again the width of the tray 75 (as defined above with reference to FIG. 27), there is a relationship $L_2=y+a_2$. Thus, since $L_2$ is presumed known, y can be determined if the value of $a_2$ is measured.

Figure 31:
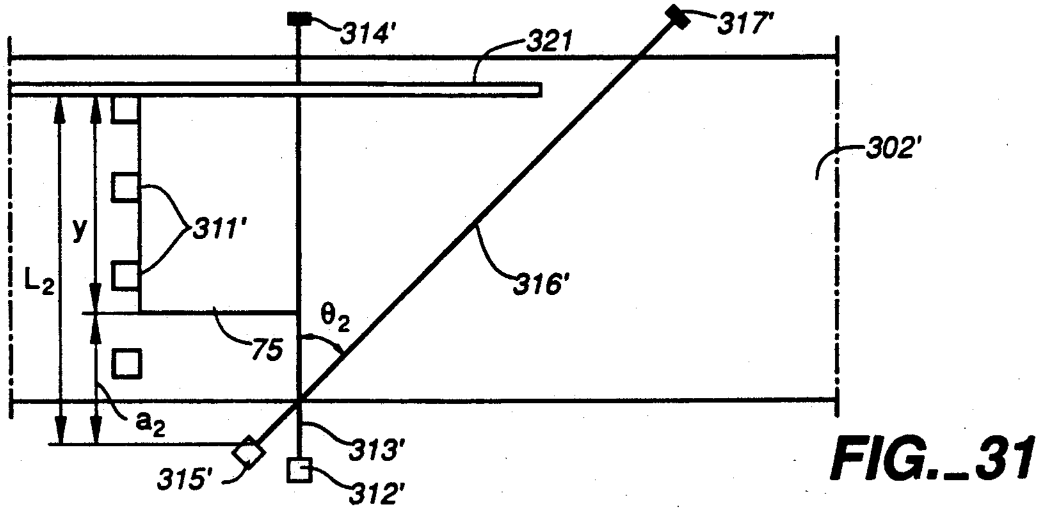
FIGS. 31 and 32 are schematic plan views of the tray on the conveyor belts of the weighing device to show the operation of the CPU to determine the dimensions of the tray according to a second embodiment of the invention.
Figure 32:
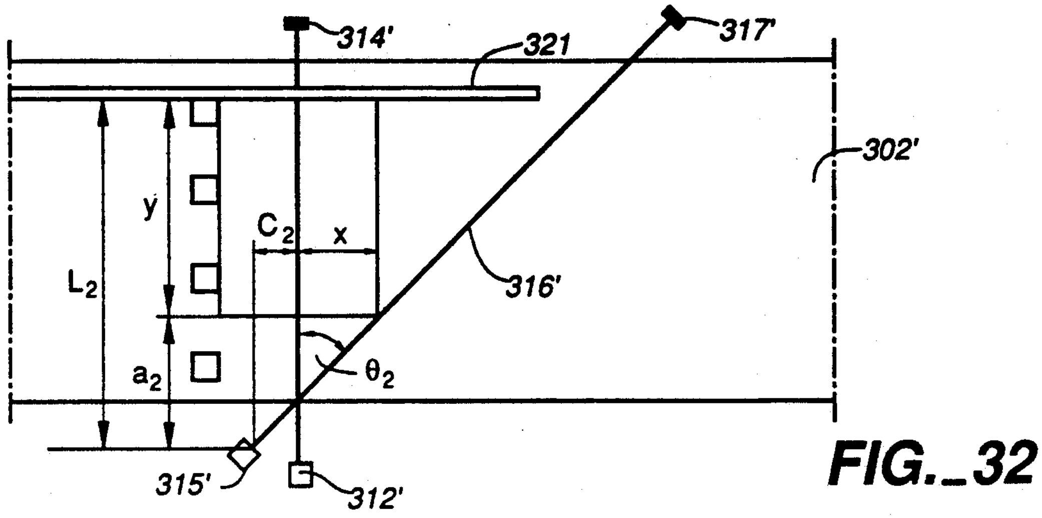

Next, let $t_5$ indicate the time at which the front edge of the tray 75 crosses the optical axis 313′ of the first optical detector 312′ as shown in FIG. 31 and $t_6$ the time at which the front corner of the tray 75 distal from the guide plate 321 crosses the optical axis 316′ of the second optical detector 315′ as shown in FIG. 32. The distance x traveled by the tray 75 between times $t_5$ and $t_6$ is $v(t_6-t_5)$. If the angle between the optical axes 313′ and 316′ is indicated by $\Theta_2$ and the distance between the first and second optical detectors 312′ and 315′ is $c_2$, $a_2=(c_2+x)/\tan\Theta_2$. Thus, according to the second embodiment of the invention described above, $y=L_2\ (c_2+x)/\tan\Theta_2$ and, if the tray 75 is placed on the conveyor belts 308 with one side contacting the guide plate 321 as shown in FIG. 31, the pushers 311 push the tray 75 forward while one side of the tray 75 remains in contact with the guide plate 321 and the width y of the tray 75 can again be measured accurately.

Figure 33:
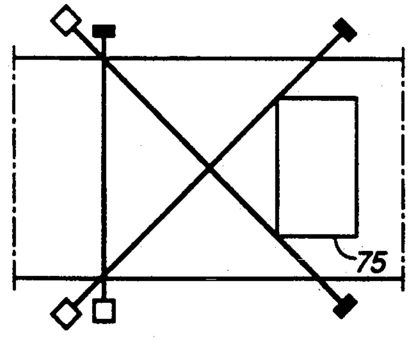
FIGS. 33-35 are schematic plan views of the tray on the conveyor belts of the weighing device to show the operation of the CPU to determine the dimensions of the tray according to still other embodiments of the invention.
Figure 34:
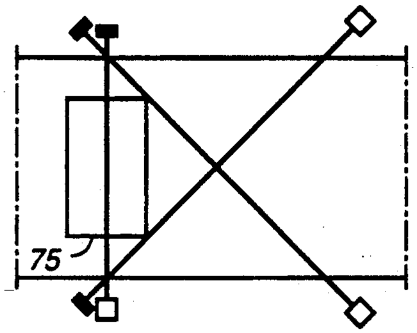
Figure 35:
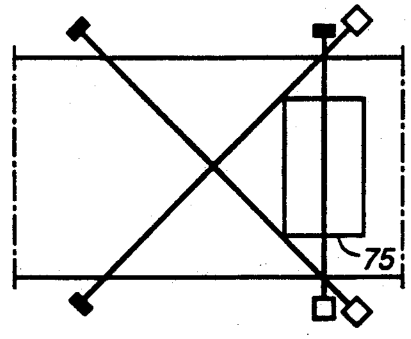

As a variation of the first embodiment described above, the detectors may be utilized to determine the points in time when the backward corners (with respect to the direction of motion of the tray 75) as schematically illustrated in FIG. 33. As another variation, the second and third optical detectors may be so oriented as to emit light diagonally backward against the direction of motion of the tray 75, detecting the forward corners of the tray 75 as shown in FIG. 34 or the backward corners as shown in FIG. 35.

Control of the Film Feeding Unit

Figure 36:
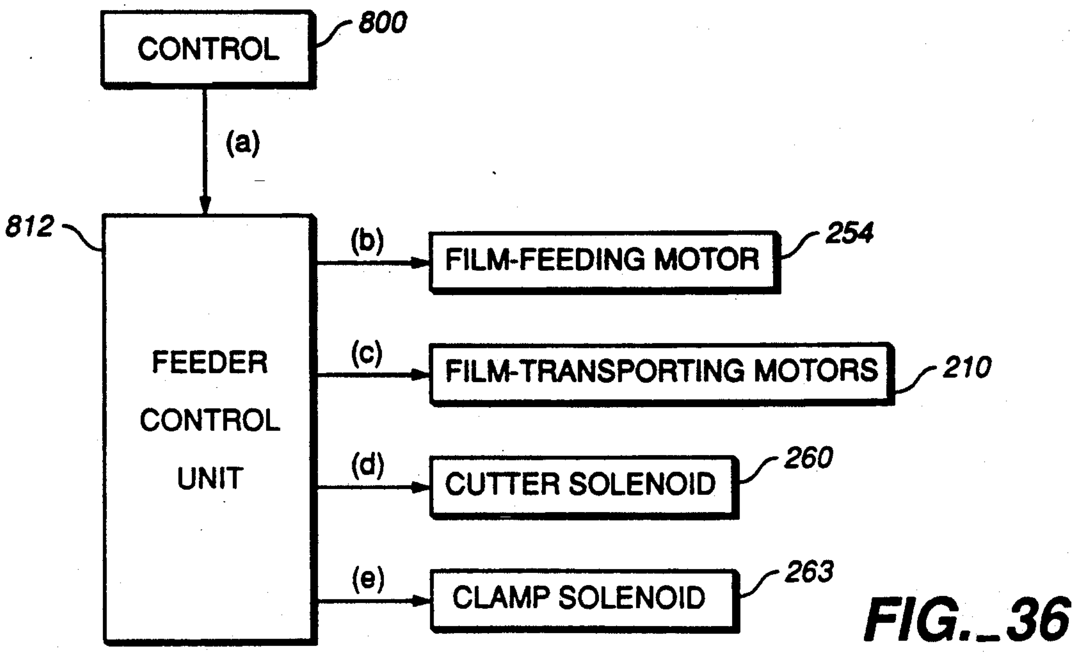
FIG. 36 is a schematic block diagram of the feeder control unit for controlling the feeding and transportation of a film.
Figure 37:
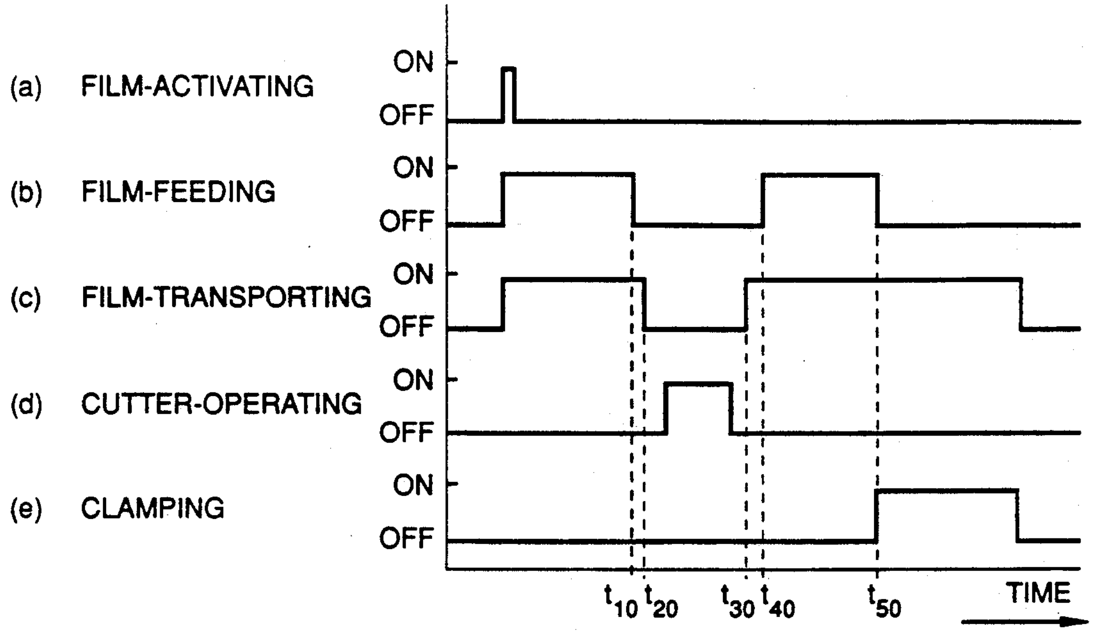
FIG. 37 is a time chart for the operation of the feeder control unit.

Reference is made next to the schematic block diagram of FIG. 36 showing a feeder control unit 812 and the timing chart of FIG. 37 to describe the control of the film feeding unit 250 or, more particularly, the film-feeding motor 254, the cutter solenoid 260 for operating the cutter 259, and the clamp solenoid 263 as well as the film-transporting motors (not shown) for driving the lower film-transporting pulleys 213. When the feeder control unit 812 receives a feeder-activating signal (shown at (a) in FIG. 37) from the control unit 804, the feeder control unit 812 responds by outputting according to a predetermined timing schedule a film-feeding signal (shown at (b) in FIG. 37) to the film-feeding motor 254, a film-transporting signal (shown at (c) in FIG. 37) to the motor (not shown) for driving the film-transporting pulleys 213, a cutter-operating signal (shown at (d) in FIG. 37) to the cutter solenoid 260 and a clamping signal (shown at (e) in FIG. 37).

To explain the timing schedule more in detail with reference to FIG. 37, the film-feeding signal to the film-feeding motor 254 and the film-transporting signal to start the motion of the film-transporting pulleys 213 are outputted as soon as the feeder-activating signal is received from the control unit 804. This simultaneously starts to direct the front edge of the film 60 towards the film transporting device 200 and to move the lower film transport belts 214 together. The front edge of the film 60 is thereby inserted between the lower and upper film transport belts 212 and 214 and the film 60, being clamped therebetween, is transported in the direction of the packaging station 500. At time $t_{10}$ with reference to FIG. 37, the output of the film-feeding signal from the feeder control unit 812 is stopped and shortly thereafter at time $t_{20}$ the output of the film-transporting signal is also stopped. This causes the fixed and movable film transporting units 201 and 202 to continue pulling the film 60 forward for a brief period of time after the feed rollers 251 and 252 stop rotating.

This effectively stretches the film 60 in the longitudinal direction and while the film 60 is held in this stretched condition between the feed rollers 251 and 252, the feeder control unit 812 outputs a cutter-operating signal, thereby activating the cutter solenoid 260 to move the cutter 259 to perforate the film 60 in the transverse direction (with respect to the direction of motion of the film 60) at a point between the two feed rollers 251 and 252. The longitudinally stretched condition of the film 60 at this point in time makes this perforation work easier. After the output of the cutter-operating signal is stopped and the cutter 259 returns to its normal lowered position, the film transport belts 212 and 214 are started first at $t_{30}$ and the film-feeding motor 254 is started shortly thereafter at time $t_{40}$, thereby causing the film 60 to continue its motion towards the packaging station 500.

When, at time $t_{50}$, the perforated line on the film 60 reaches a position downstream of the clamping member 262 but upstream of the upper transport belt 212, the clamp solenoid 263 is activated to cause the clamping member 262 to move upward and to clamp the film 60. At the same time, the feed rollers 251 and 252 are stopped but since the film transport belts 212 and 214 are continuing to move, the film 60 becomes torn along the perforated line. Thereafter, the piece of film 60 thus cut to a desired length resumes its journey towards the packaging station 500 while maintaining its longitudinally stretched condition.

According to the present invention, furthermore, the speeds of the motors are so adjusted that the speed of film transport is slightly greater by the film transporting units 201 and 202 than by the film feeding unit 250. In this manner, the film 60 can be put in a properly stretched condition at the packaging station 500. Since this desirable result can be accomplished merely by thus adjusting the speeds of the motors, the invention effectively reduces the production cost of the packaging apparatus as a whole. The timing chart of FIG. 37 is not intended to limit the scope of the invention. For example, the timing of stopping and re-starting the operations of the film transport belts 212 and 214 and the film-feeding motor 254 need not be differentiated both before and after the operation of the cutter 259.

Figure 41:
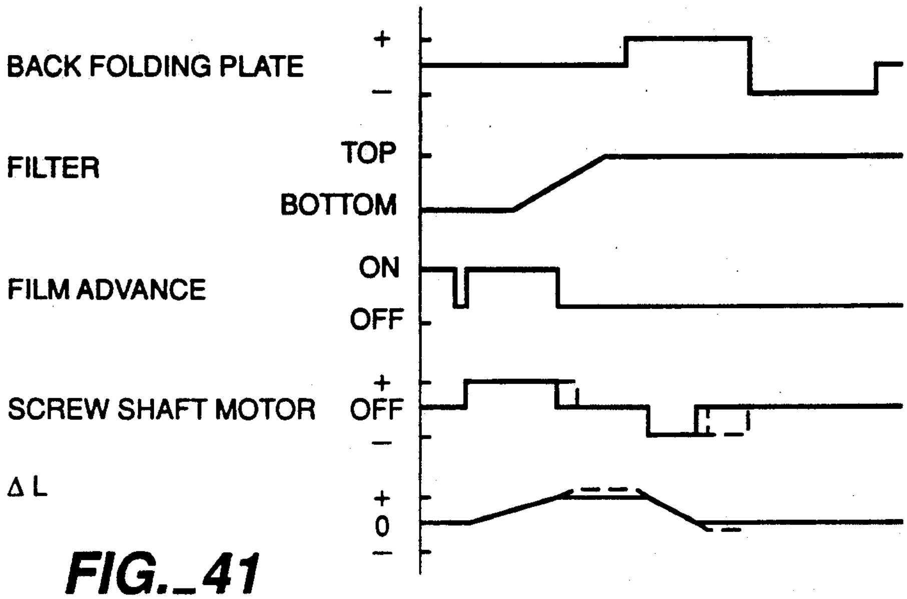
FIG. 41 is a time chart of operating the control system for stretching the film at the packaging station.
Figure 38:
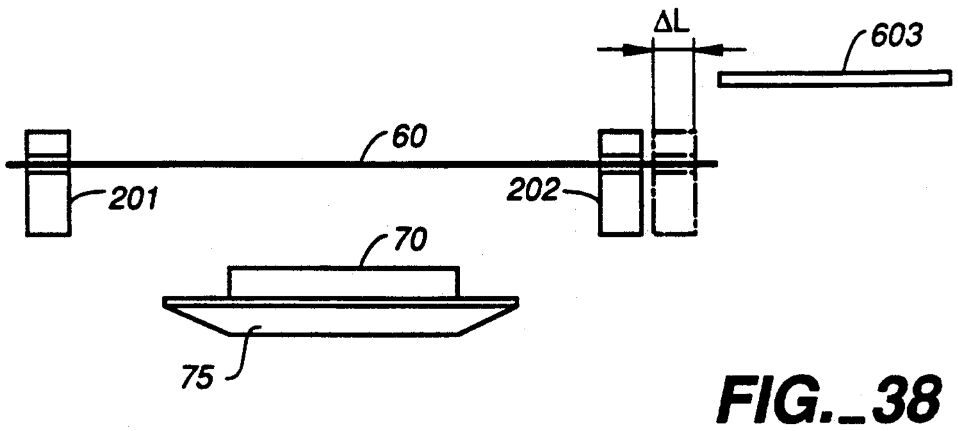
FIGS. 38-40 are schematic side views of the film stretched at the packaging station to show a process for stretching the film in the longitudinal direction.
Figure 39:
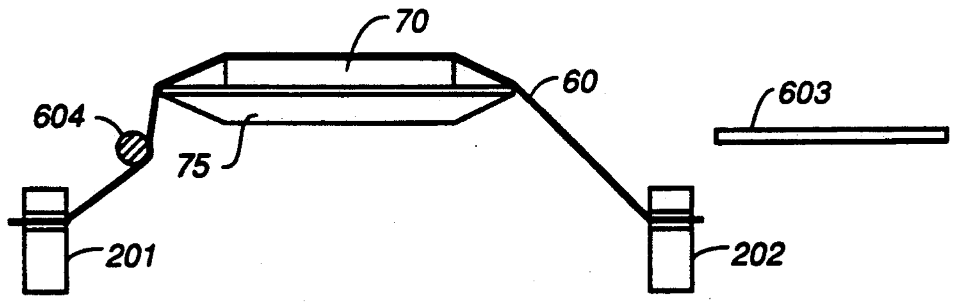
Figure 40:
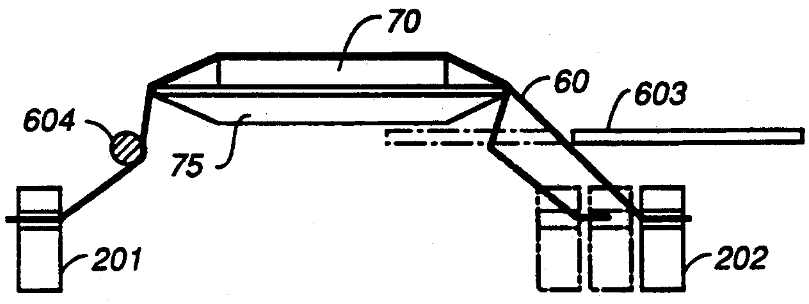

Alternatively, tension may be provided to the film 60 at the packaging station 500 by operating the screw-shaft motor 210 to move the movable film transporting unit 202 as shown in FIG. 38 by a predetermined small distance indicated by ΔL from its position indicated by solid lines to its removed position indicated by dotted lines. Thereafter, as shown in FIG. 39, the loaded tray 75 is lifted by the lifter 400 (not shown in FIG. 39) such that the item 70 on the tray 75 pushes upward and further stretches the film 60. Still thereafter, the back folding plate 603 is advanced and its front edge comes into contact with the side edge sections of the film 60 as shown in FIG. 40. As the back folding plate 603 advances still farther, the movable film transporting unit 202 is moved back to its original position as shown in dotted lines in FIG. 40 such that the film 60 will not be excessively stretched without becoming slack. FIG. 41 shows a timing schedule for the operation of the lifter 400, the folding device 600, the film transporting device 200 as well as the screw-shaft motor 210 for effecting the operation described above.

As a variation to the above, the movable film transporting unit 202 may be advanced farther beyond its original position as the back folding plate 603 is moved forward from the position shown in FIG. 39 to that shown in FIG. 40. This tends to prevent the generation of an excessive tension in the film 60 when the back folding plate 603 folds the edge section of the film 60 towards the bottom surface of the tray and hence to prevent the peripheries of the tray 75 from bending or the film 60 from breaking.

The distance ΔL by which the movable film transporting unit 202 is moved away from the fixed film transporting unit 201 may be increased as shown by dotted lines in FIG. 41. The distance ΔL is generally determined by the height of the item 70 on the tray 75, the size of the tray 75 as well as the strength of the material for the tray 75. Desired values of ΔL may be preliminarily stored within the control device 800 such that the user can operate the keyboard 803 to select an optimum value depending on the conditions of the tray 75 and the item 70 to be packaged.

According to the present invention, the roll supporting device 100 is capable of supporting film rolls 101 of different lengths. The movable film transporting unit 202 can be moved according to the width of the film 60 so as to clamp one of the side edge sections of the film 60. As a variation, a sensor for detecting the width of the film 60 may be installed such that the distance ΔL to be traveled by the movable film transporting unit 202 is automatically adjusted according to this detected film width.

Control of the Lifter and the Supply of Film

As briefly mentioned above with reference to FIG. 7, the lifter 400 may be provided with a pair of optical sensors (referred to as the object detection sensors 421) opposite to each other across the path of the tray 75 as it is transported to the lifter 400 from the weighing device 300. The object detection sensors 421 not only serve to measure the distance $D_1$ which the tray 75 travels from the moment when its front edge (as it is moved to the lifter 400) crosses their position until the tray 75 stops on top of the support heads 404, but also serve to detect whether or not there is a tray at all supported on the support heads 404. Since the position at which the back edge of the tray 75 stops after the tray 75 is brought from the weighing device 300 to the lifter 400 is generally constant, the distance D2 along the direction of motion of the tray 75 between this position of the back edge and the position of the object detection sensors 421 is presumed known. Thus, the longitudinal dimension D of the tray 75 (in the direction of its motion from the weighing device 300 to the lifter 400) is determined by adding $D_1$ and $D_2$.

Figure 43:
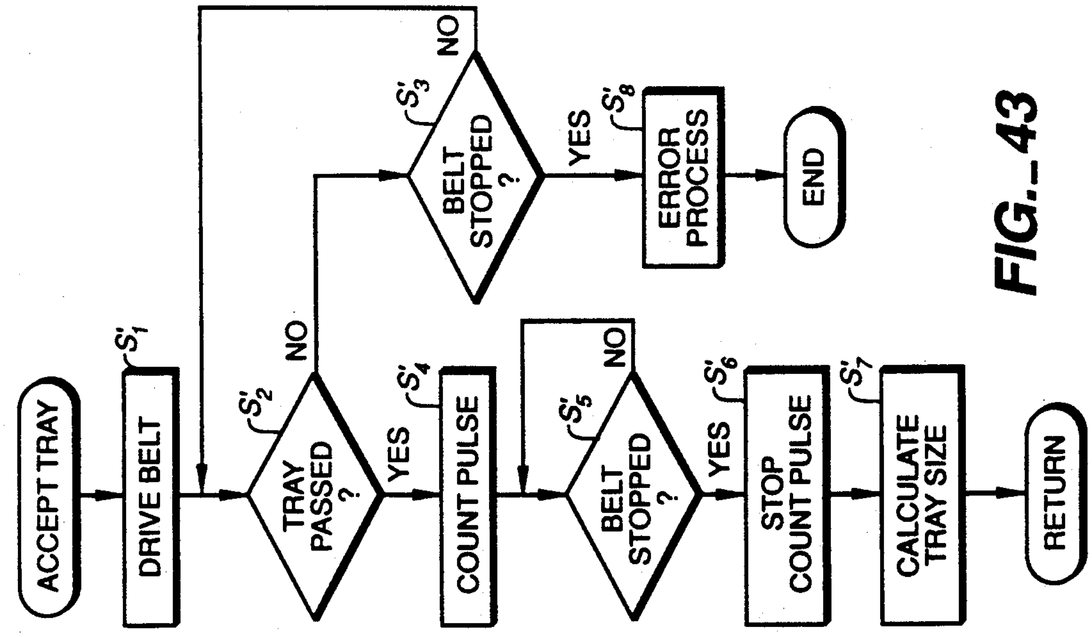
FIGS. 42 and 43 are flow charts for the control of the lifter by the control device according to the present invention.

Next, the control of the lifter 400 by the control device 800 is described with reference to the flow charts shown in FIGS. 42 and 43.

When the weighing operation on a loaded tray to be packaged is completed by the weighing device 300 (YES in S1), presence or absence of the film 60 at the packaging station 500 is ascertained on the basis of a signal from the film detection sensors 422 (S2). Immediately after the apparatus 50 is switched on and before the film transporting device 200 can deliver the front edge of the film 60 to the packaging station 500, the film detection sensors 422 output a signal indicative of the absence of the film 60 (NO in S2). Immediately after the apparatus 50 is switched on and before any tray has been delivered to the lifter 400 from the weighing device 300, the object detection sensors 421 output a signal indicative of the absence of any tray on the support heads 404 (NO in S3) and an operation is started for transporting a weighed tray from the weighing device 200 to the lifter 400 (S4).

Figure 42:
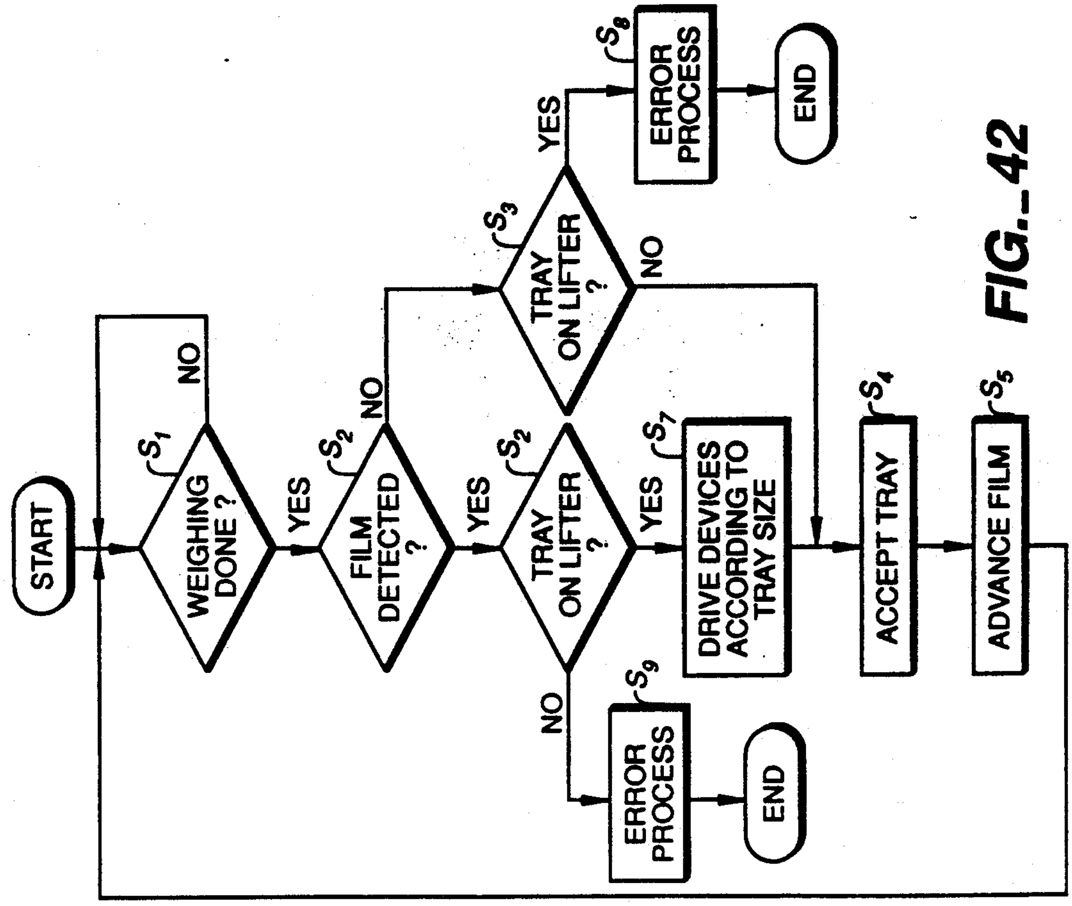

The operation performed in Step S4 of the flow chart in FIG. 42 is further explained in detail with reference to FIG. 43. First, the control device 800 outputs a pulse signal to the stepping motor 309, thereby causing the conveyor belts 308 to move in the normal direction of transportation (S1'). If it is determined from a signal received from the object detection sensors 421 that the tray 75 has not passed the position of the object detection sensors 421 (NO in S2'), it is checked whether the conveyor belts 308 have been advanced by a predetermined distance and come to a stop (S3'). If not, the conveyor belts 308 are caused to keep advancing and when the crossing of the tray 75 at the position of the object detection sensors 421 is detected (YES in S2'), it is started to count from this moment on the number of pulses outputted to the stepping motor 309 (S4'). The counting of pulse continues until the conveyor belts 308 have advanced by the specified distance and stopped (YES in S5' and S6') and the number of pulses thus counted is used to calculate the distance $D_1$ shown in FIG. 7 and defined above because the distance by which the tray 75 moves per pulse is presumed known. Since the distance $D_2$ is also presumed known, the dimension D is obtained by adding $D_1$ and $D_2$ as explained (S7') above and the value of D thus obtained by the addition is stored in the RAM 807. If the passage of the tray 75 cannot be acknowledged in Step S2' and if it is further detected in Step S3' that the movement of the conveyor belts 308 has stopped, an error routine is performed (S8'), displaying on the display device 802 a message to inform the user that there is no tray, and stopping the control operation.

With reference to FIG. 42 again, the film 75 is advanced to the packaging station 500 (S5) by operating the film transporting device 200 as soon as the tray 75 is moved to the lifter 400. This completes the first control cycle and the second cycle is started immediately thereafter. In the second cycle, the film 60 is normally detected in Step S2 and the tray 75 is likewise normally detected in Step S6. If so (YES in S2 and S6), the various devices of the apparatus 50 are controlled according to the dimensions of the tray 75 calculated in Step S7' in the previous control cycle described above (S7). In the subsequent control cycles, if the absence of film is detected in Step S2 and the presence of a tray on the support heads 404 is detected in Step S3, a display is made on the display device 802 to warn the user that there is no film (S8), the control being thereafter terminated. Similarly, if the presence of film is detected in Step S2 and the absence of a tray on the support heads 404 is detected in Step S6 in these subsequent control cycles, an error routine is performed (S9), displaying on the display device 802 a message to warn the user that there is no tray and to request the removal of the film and terminating the control operation.

Control of the Folding Device

Figure 44:
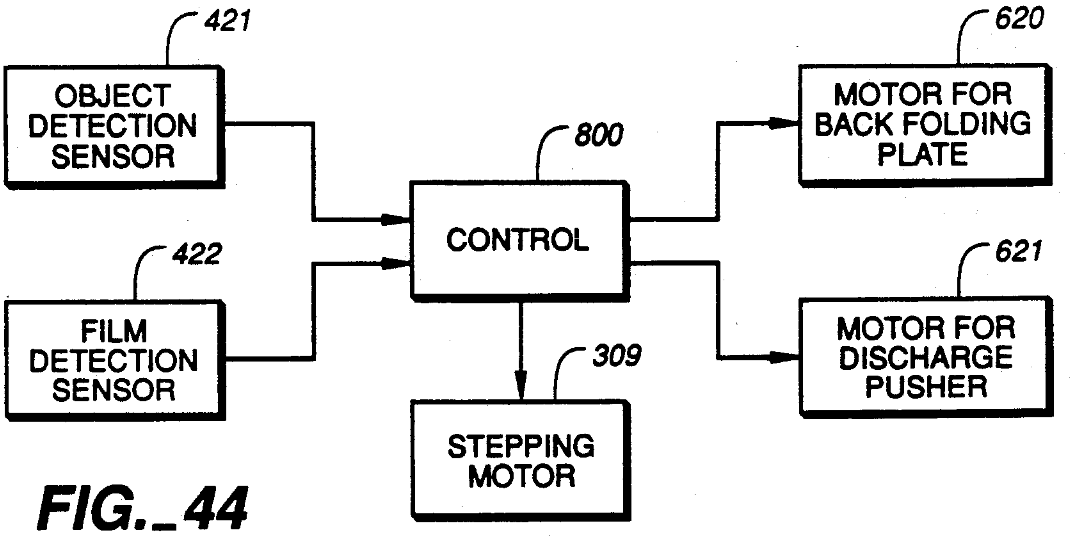
FIG. 44 is a block diagram of the control device related to the control of the lifter and the folding device.

As explained above, the control device 800 not only determines the dimensions of the tray to be packaged but also controls the packaging operations according to the measured dimensions of the tray. The control of the folding device 600 and, more particularly, its back folding plate 603 and the discharge pusher 605 in addition to the aforementioned control of the lifter 400 by receiving detection signals from the object and film detection sensors 421 and 422 may be schematically described by the block diagram of FIG. 44. Its operation is described next with reference to FIGS. 45–49.

Figure 45:
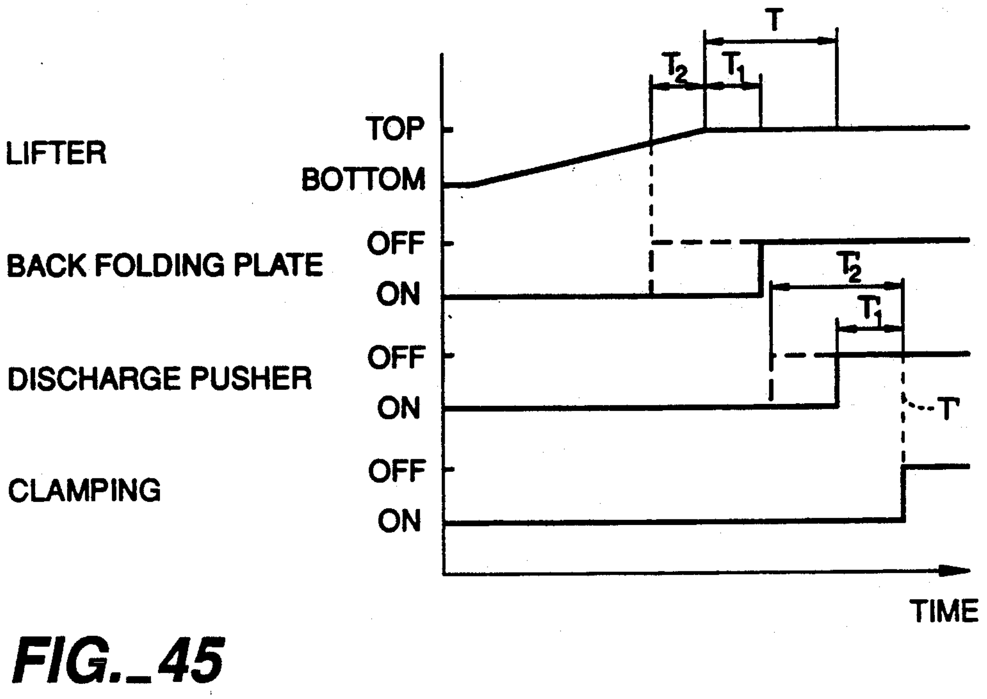
FIG. 45 is a timing chart for the operation at the packaging station.
Figure 46:
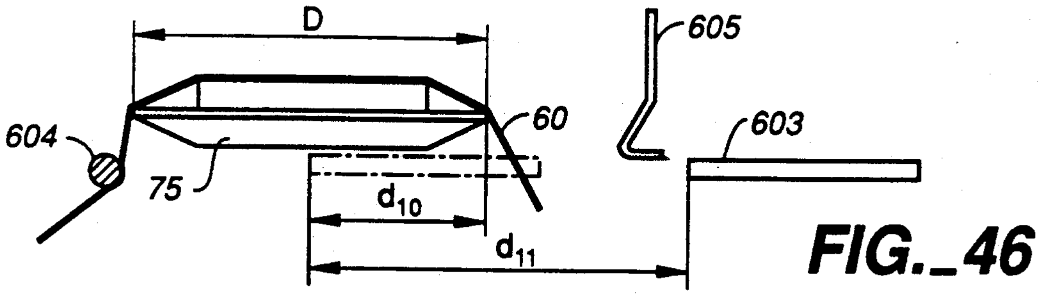
FIGS. 46-49 are schematic drawings for explaining the operations of the back folding plate and the discharge pusher.
Figure 47:
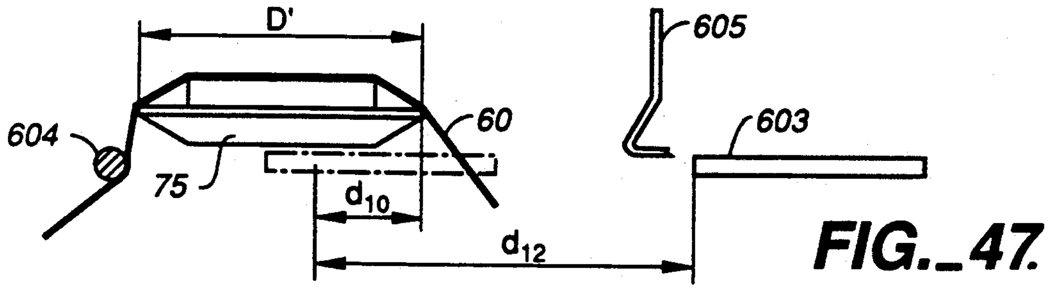

With reference first to FIGS. 45 and 46, when the tray 75 of length (in the direction of motion of the discharge pusher 605) D is lifted to the packaging station 500 and pressed upward against the film 60 stretched therein as shown in FIG. 46, the forward motion of the back folding plate 603 is started as shown by solid line in FIG. 45 at a specified time $T_1$ after the lifter 400 reaches its highest point. During a period indicated by T in FIG. 45 starting when the lifter 400 reaches its highest point, the back folding plate 603 moves forward by a distance indicated by $d_{11}$ to the folding position indicated by dotted lines in FIG. 46, thereby folding the back edge portion of the film 60 by $d_{10}$ towards the bottom surface of the tray 75. In the case of a smaller tray with length D' (D'<D) as shown in FIG. 47, by contrast, the back folding plate 603 has a longer distance $d_{12}$ to travel to reach the position shown in dotted lines if the back edge portion of the film 60 is to be folded by the same amount ($d_{10}$). For this purpose, the forward motion of the back folding plate 603 may have to be started $T_2$ before the lifter 400 reaches its highest point as shown by dotted line in FIG. 45.

Figure 48:
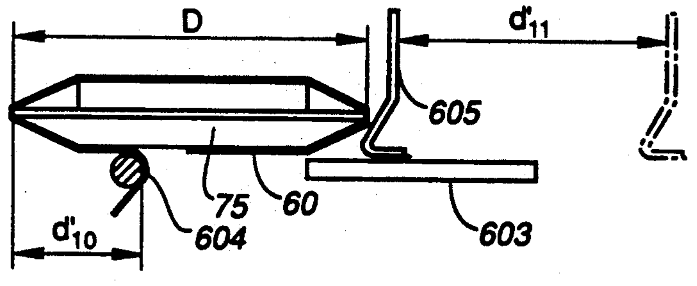
Figure 49:
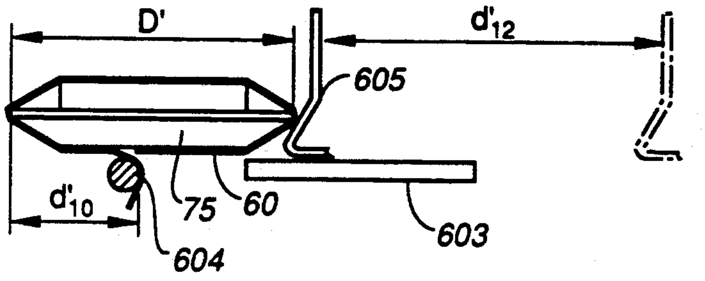

As for the operation of the discharge pusher 605 against a tray with length D as shown in FIG. 48, its forward motion is started a specified time $T_1'$ before T' as shown by a solid line in FIG. 45, T' being the clamp-release time when the clamping means clamping the front edge section of the film 60 is released. This is such that the tray 75 moves forward by a specified distance $d_{11}'$ (from the initial position indicated by dotted line) before the clamp-release time T' and length $d_{10}'$ of the front edge section of the film 60 will be folded back from the front edge of the tray 75 to the folding bar 604. In the case of a smaller tray with length D' (D' <D) as shown in FIG. 49, by contrast, the discharge pusher 605 has a longer distance $d_{12}'$ (than $d_{11}'$) to travel forward to push the tray 75 such that the same distance $d_{10}'$ of the front edge section of the film 60 will be folded downward between the front edge of the tray 75 and the folding 604. For this purpose, the forward motion of the discharge pusher 605 must be started a longer time $T_2'$ (than $T_1'$) before the clamp-release time T' as indicated by a dotted line in FIG. 45.

With the control device 800 thus controlling the motion of the back folding plate 603 and the discharge pusher 605 automatically according to the length of the tray 75 as determined above, both larger trays and smaller trays can be packaged uniformly and this improved workability is accomplished merely by means of a few extra sensors. Moreover, since the presence and absence of the tray in the lifter 400 and of the film 60 at the packaging station 500 are constantly monitored, errors in the operation can be prevented and reliability of the operation improves significantly.

The control according to the length of the tray as described above is not intended to limit the scope of the invention. Determination of the width of the tray has already been discussed above. On the basis of the measured width of the tray, the control device 800 may be additionally programmed to control the motion of the left-hand and right-hand side folding plates 601 and 602 in similar manners so as to control the distance by which the side edge sections of the film 60 may be folded towards the bottom surface of the tray.

Control of the Sealing Device

The control device 800 receives signals from the sealer position sensor 705 and the weighing device 300 and outputs signals on the basis thereof to the sealing device 700 and the label printer 900 as well as to the folding device 600 to control their operations. As explained above, the user can operate on the keyboard 803 of the control device 800 to select the weighing-packaging-pricing mode, the packaging mode or the weighing-pricing mode, but if a signal indicative of the retracted condition of the sealing device 700 is received from the sealer position sensor 705, the weighing-pricing mode of operation is automatically selected, signals from the weighing device 300 are received by the control device 800 where the price of the package to be made is calculated, and the label printer 900 is thereby caused to print this price on a label according to a price-indicating signal received from the control device 800 and to issue this printed label through the label dispenser 950.

When it is desired to use the weighing-packaging-pricing apparatus 50 of the present invention only for the purpose of weighing already packaged products without price labels thereon and producing price labels therefor, the user should select the weighing-pricing mode of operation. In this situation, since the products to be weighed and priced are already sealed, the sealing device 00 is not needed for the intended operation and hence is rotated around its support shafts 704 to be kept in its retracted position shown by dotted lines in FIG. 7. In this manner, the sealing device 700, which normally protrudes as shown in FIGS. 2 and 7, does not stand in the way of the user when the issued price labels are pasted on weighed products and work efficiency can be thereby improved. The automatic selection of the weighing-pricing mode of operation when the sealer position sensor 705 detects the retracted condition of the sealing device 700 also adds to the improved workability of the apparatus according to this invention.

The manner of retracting the sealing device 700 described above with reference to FIG. 7 is not intended to limit the scope of this invention. The entirety of the sealing device 700 may be made inwardly slidable to the interior of the main housing 51 or may be made detachably attachable to the main housing 51.

According to another embodiment of the invention, the control device 800 may be so designed that power supply to the sealing device 700 is automatically stopped if the retracted condition of the sealing device 700 is detected. According to still another embodiment of the invention, power supply is reduced when the sealing device 700 is retracted such that power consumption by the sealing device 700 is reduced when it is not in use.

To summarize, weighing-packaging-pricing apparatus with improved capabilities become available according to the present invention. Since there is a connection between a roll supporting device having a pair of holders (one fixed and the other movable) and a film transporting device having a pair of film transporting units (one fixed and the other movable), the separation between the two film transporting units clamping mutually opposite side edge sections of a film sheet can be automatically adjusted according to the length of the film roll supported between the pair of holders such that the user is not required to make the adjustment of the units each time a new film roll is installed. Although feed rollers with mirror-finished surfaces are used, the braking means for these rollers is released when their driving motor is not operating and the means for pressing the film against them is lifted such that the position of the film being fed can be easily corrected and hence the chances of generating wrinkles in the film are significantly reduced. The weighing device is provided with an improved system of only a few optical detectors to accurately and efficiently measure both the longitudinal and transverse dimensions of the object to be packaged while it is being weighed and transported to the lifter and the data thus acquired are used by the control device to operate the folding device optimally so that edge sections of the film sheet are folded neatly especially around the corners. The lifter with collapsible legs and bendable heads according to the present invention is particularly convenient for use in conjunction with the folding device of the type herein because the collapsed legs allow the film sheet over the object to hang properly downward such that its edge sections are sure to be caught by the folding plates of the folding device independently of the size of the object and without the necessity of providing more than one lifter of different sizes. The heads which are each bendable in a specified direction make the operation of the folding device more effective. The sealing device is not only disposed conveniently above the weighing device but made retractable so as not to interfere with the operations of the user when the apparatus is being used in a mode not involving packaging. Since the sealer position sensor automatically causes the control device to select such a mode of operation if the sealing device is detected in its retracted condition, the user is not required to take the trouble of operating the keyboard to affirmatively select such a mode.

These are but a part of many advantages achievable by the present invention. Any variations and modifications of the embodiments described above, which are capable of achieving the above and other advantages and may be apparent to persons skilled in the art, are intended to be within the scope of this invention.

What is claimed is:

1. In a packaging apparatus which supports a stretched film sheet at a packaging station, lifts an object from below said stretched film sheet and packages said object by folding edge sections of said film sheet towards the bottom surface of said object, the improvement wherein said packaging apparatus includes a folding device which comprises:

folding means substantially consisting of a pair of side folding means for folding left-hand and right-hand side edge sections of said film sheet towards the bottom surface of said object by traveling a specified distance towards each other from left-hand and right-hand sides of said object, and control means for adjusting said specified distance according to the transverse dimension of said object, said control means causing said side folding means to start traveling towards each other sooner after said object arrives at said packaging station if said transverse dimension is relatively small than if said transverse dimension is relatively large, said film sheet being folded by a same amount independently of said transverse dimension of said object.

2. The packaging apparatus of claim 1 further comprising sensor means for measuring said transverse dimension of said object before said object arrives at said packaging station.

3. In a packaging apparatus which supports a stretched film sheet at a packaging station, lifts an object from below said stretched film sheet and packages said object by folding edge sections of said film sheet towards the bottom surface of said object, the improvement wherein said packaging apparatus includes a folding device which comprises:

folding means substantially consisting of a pair of side folding means for folding left-hand and right-hand side edge sections of said film sheet towards the bottom surface of said object by traveling a specified distance towards each other from left-hand and right-hand sides of said object, and control means for adjusting said specified distance according to the transverse dimension of said object, said control means causing said side folding means to reverse directions of their motion sooner after starting their motion towards each other if said transverse dimension is relatively large than if said transverse dimension is relatively small, said side folding means traveling said specified distance independently of said transverse dimension of said object.

4. The packaging apparatus of claim 3 further comprising sensor means for measuring said transverse dimension of said object before said object arrives at said packaging station.

5. In a packaging apparatus which supports a stretched film sheet at a packaging station, lifts an object from below said stretched film sheet and packages said object by folding edge sections of said film sheet towards the bottom surface of said object, the improvement wherein said packaging apparatus includes a folding device which comprises folding means substantially consisting of a pair of side folding means for folding left-hand and right-hand side edge sections of said film sheet towards the bottom surface of said object by traveling a specified distance towards each other from left-hand and right-hand sides of said object, and control means for adjusting said specified distance according to the transverse dimension of said object.

6. The packaging apparatus of claim 5 further comprising sensor means for measuring said transverse dimension of said object before said object arrives at said packaging station.

7. The packaging apparatus of claim 5 wherein said folding device further comprises a pair of motor means individually associated with said pair of side folding means for driving said pair of side folding means.

8. The packaging apparatus of claim 5 wherein said folding device further comprises a back folding means for folding a back edge section of said film sheet towards the bottom surface of said object for traveling in a forward direction, the motion of said back folding means being controlled independently of the motion of said side folding means.

* * * * *